United States Patent
Costello et al.

(10) Patent No.: US 12,008,886 B2
(45) Date of Patent: Jun. 11, 2024

(54) BUILDING SECURITY SYSTEM WITH ALARM LISTS AND ALARM RULE EDITING

(71) Applicant: Tyco Fire & Security GmbH, Neuhausen am Rheinfall (CH)

(72) Inventors: Maebh Costello, Cork (IE); Federico Fala, Cork (IE); Jan R. Holliday, Maryville, IL (US); Nicolae Bogdan Pavel, Cork (IE); Abdul Razak, Cork (IE)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 169 days.

(21) Appl. No.: 17/517,419

(22) Filed: Nov. 2, 2021

(65) Prior Publication Data
US 2022/0130228 A1   Apr. 28, 2022

Related U.S. Application Data

(63) Continuation of application No. 16/665,990, filed on Oct. 28, 2019, now abandoned.

(60) Provisional application No. 62/751,898, filed on Oct. 29, 2018.

(51) Int. Cl.
*G06F 16/00* (2019.01)
*G06F 16/35* (2019.01)
*G08B 13/08* (2006.01)
*G08B 25/00* (2006.01)

(52) U.S. Cl.
CPC ........... *G08B 25/008* (2013.01); *G06F 16/35* (2019.01); *G06F 16/353* (2019.01); *G06F 16/355* (2019.01); *G06F 16/358* (2019.01); *G08B 13/08* (2013.01)

(58) Field of Classification Search
None
See application file for complete search history.

(56) References Cited

U.S. PATENT DOCUMENTS 5,673,034 A     9/1997  Saliga
8,893,006 B2 *  11/2014 Haeberle ................... G06F 8/20
                                                     715/733

(Continued)

FOREIGN PATENT DOCUMENTS

IN    4780/CHE/2013    10/2013

OTHER PUBLICATIONS

Ester, et al. A Density-Based Algorithm for Discovering Clusters in Large Spatial Databases with Noise, 6 pages, Institute for Computer Science, University of Munchen, Germany, 1996 (6 pages).

*Primary Examiner* — Debbie M Le
(74) *Attorney, Agent, or Firm* — Foley & Lardner LLP

(57) ABSTRACT

A building security system includes one or more memory devices configured to store instructions, that when executed on one or more processors, cause the one or more processors to receive, for each of alarm rules, one or more alarm rule parameters for each of the alarm rules from a user device, receive security system data from a security system, and for each alarm rule of the alarm rules determining, based on the one or more alarm rule parameters for the alarm rule, whether the alarm rule is triggered by the security system data and generating an alarm for the alarm rule in response to determining that the alarm rule is triggered.

20 Claims, 55 Drawing Sheets

| Cluster Number | Number of systems | Not performing tests | Inconsistent | Consistent |
|---|---|---|---|---|
| 1 | 6 | -- | 2 | 4 |
| 2 | 6 | 2 | 1 | 3 |
| 3 | 3 | 3 | -- | -- |
| 4 | 22 | 6 | 12 | 4 |
| 5 | 11 | 1 | 7 | 3 |
| 6 | 2 | -- | -- | 2 |
| 7 | 5 | 1 | 2 | 2 |
| 8 | 3 | 1 | -- | 2 |
| 9 | 96 | 6 | 35 | 55 |
| 10 | 9 | -- | 4 | 5 |
| 11 | 99 | -- | 19 | 73 |
| 12 | 14 | -- | 2 | 12 |
| 13 | 3 | -- | -- | 3 |

(56) References Cited

U.S. PATENT DOCUMENTS

| | | | |
|---|---|---|---|
| 8,970,349 B2* | 3/2015 | Gutierrez | G08B 13/19671 726/19 |
| 9,064,219 B2* | 6/2015 | Hall | G06F 16/23 |
| 9,292,013 B2* | 3/2016 | Keil | G05B 19/042 |
| 10,248,849 B2 | 4/2019 | Kephart | |
| 10,627,984 B2* | 4/2020 | Thompson | G06Q 10/0639 |
| 10,648,692 B2* | 5/2020 | Chatterjee | F24F 11/65 |
| 2004/0153386 A1 | 8/2004 | Eckerdt | |
| 2004/0181690 A1 | 9/2004 | Rothermel et al. | |
| 2007/0226616 A1 | 9/2007 | Gagvani et al. | |
| 2011/0072506 A1 | 3/2011 | Law et al. | |
| 2012/0084288 A1 | 4/2012 | Abdul-Razzak et al. | |
| 2012/0100825 A1 | 4/2012 | Sherman et al. | |
| 2012/0102543 A1 | 4/2012 | Kohli et al. | |
| 2014/0096045 A1 | 4/2014 | Dobryanskaya et al. | |
| 2014/0197959 A1 | 7/2014 | Tarmey et al. | |
| 2015/0262133 A1* | 9/2015 | Banchero | G06Q 10/20 705/305 |
| 2017/0213447 A1 | 7/2017 | Horrocks et al. | |
| 2018/0047230 A1 | 2/2018 | Nye | |
| 2018/0096197 A1 | 4/2018 | Kephart | |
| 2019/0033802 A1* | 1/2019 | Chatterjee | G05B 15/02 |
| 2020/0134421 A1* | 4/2020 | Suthar | G06F 11/302 |

* cited by examiner

600

| Cluster Number | Number of systems | Not performing tests | Inconsistent | Consistent |
|---|---|---|---|---|
| 1 | 6 | -- | 2 | 4 |
| 2 | 6 | 2 | 1 | 3 |
| 3 | 3 | 3 | -- | -- |
| 4 | 22 | 6 | 12 | 4 |
| 5 | 11 | 1 | 7 | 3 |
| 6 | 2 | -- | -- | 2 |
| 7 | 5 | 1 | 2 | 2 |
| 8 | 3 | 1 | -- | 2 |
| 9 | 96 | 6 | 35 | 55 |
| 10 | 9 | -- | 4 | 5 |
| 11 | 99 | -- | 19 | 73 |
| 12 | 14 | -- | 2 | 12 |
| 13 | 3 | -- | -- | 3 |

FIG. 6

HOME

All monitoring zones
Sorted by: Severity

Event type primary - Event type secondary  10 hrs ago
ID: 12345678
▬▬ 50  ● Building name, Building type - City, State, Country  00:00 (GMT+0:00)  ⊙ Device name

Event type primary - Event type secondary  1 hrs ago
ID: 12345678
▬▬ 10  ● Building name, Building type - City, State, Country  00:00 (GMT+0:00)  ✓ In progress by Brad Right
⊙ Device name

Event type primary - Event type secondary  10 min ago
ID: 12345678
▬▬ 80  ● Building name, Building type - City, State, Country  00:00 (GMT+0:00)  ⊙ Device name

Event type primary - Event type secondary  1 min ago
ID: 12345678
▬▬ 25  ● Building name, Building type - City, State, Country  00:00 (GMT+0:00)  ⊙ Device name

Event type primary - Event type secondary  1 min ago
ID: 12345678
▬▬ 100  ● Building name, Building type - City, State, Country  00:00 (GMT+0:00)  ⊙ Device name

Event type primary - Event type secondary  1 min ago
ID: 12345678
▬▬ 100  ● Building name, Building type - City, Sta... ⊙ Device name ⌂ Home
▦ Trace
⚙ Maintenance — 1702 (list area)
— 1704 You have accepted alarm ID 12345678

This alarm can't be accepted
ID: 12345678
There was an error while accepting the alarm.
Please try again
   OK   TRY AGAIN
— 1706

This alarm can't be accepted
ID: 12345678
This alarm has been accepted by [Another User]
   CANCEL   VIEW ALARM
— 1708

Close alarm 12345678 — 2002
Disposition code is required

Disposition code* ▼

Comment

CANCEL  OK

Close alarm 12345678 — 2002
Disposition code is required

Disposition code* ▼
Select a disposition code

Comment — 2004

CANCEL  OK

— 2006
Clear-Equipment problem
Clear-Service/test
Clear-Accidental cause
Clear-Other
Dispatch-Confirmed source
Dispatch-Unconfirmed source
Resolved w/o dispatch
Other

Close alarm 12345678 — 2002
Disposition code is required

Dispatch-Confirmed source ▼

Comment

CANCEL  OK

■ Event type primary - Event type secondary
ID: 12345678
▦ 25 ● Building name, Building type - City, State, Country    00:00 (GMT+0:00)

Accept   Close   Select

Badge use detected for John Joyce
This is a notification from [name] to indicate badge activity

Summary
This is the summary of the badge activity

---

3002

( Threat of violence )

(JJ) Name John Joyce
Activity Access control - Access granted
Badge used 123456
Activity time Nov 11th 2017 - 09:30 (GMT -8)

Device ABC 3RD FLR SW
Building ABC
Address Redmond, Washington, USA

[ VIEW IN ]

3004

Details
The activity, location, and time in details

---

3006

Person traced    ( Threat of violence )
The holder of the badge that is traced

| | |
|---|---|
| Name | John Joyce |
| Alias | v-johjoy |
| Badge | 123456 (active) |
| | 789123 (inactive) |
| Badge holder employer | Pinkerton |
| Employee type | Vendor |

Activity traced
The details on the activity triggered by the badge

3008

| | |
|---|---|
| Activity type | Access control - Access granted |
| Activity time | Nov 11th 2017 - 09:30 (GMT -8) |
| Building | ABC |
| Building type | Office |
| Address | Redmond, Washington, USA |
| Campus | Corporate West |
| Device | ABC 3RD FLR SW |

Case Management
More information on the badge trace

Incident summary
John Joyce has been detected in the building, he is prohibited from entry.

3010

---

Case Management
More information on the badge trace

Incident summary
John Joyce has been detected in the building, he is prohibited from entry.

3010

Response Instructions
Contact police, do not confront.

Case Type
TOV - Threat of Violence

PPM
This notification was generated based on data of System A and has been recorded in System A.

Badge Trace Review Date
Badge trace was generated on 3/4/2018. The current notification was generated on 3/10/2018.

---

You received this email because you, [name] at [email address] are specified as the person to notify. You will continue receiving email notification in relation to this Badge Trace for John Joyce until Nov 22nd 2017 - 23:59 (GMT -8)

This trace was originally created by Patricia Pink, v-patpin on Nov 11th 2017 - 09:30 (GMT -8)

This email is sent to you, [email address] as a user. If you'd like to change how you receive emails, check your preferences.

In relation to   you can contact the Fusion Center at number 555-1234 or reply back to fusion.center@   .com

3012

3014

---

3002

( Threat of violence )

(JJ) Name John Joyce
Activity Access control - Access granted
Badge used 123456
Activity time Nov 11th 2017 - 09:30 (GMT -8)

Device ABC 3RD FLR SW
Building ABC
Address Redmond, Washington, USA

[ VIEW IN ]

FIG. 30

Trace

< Home

Badge Trace
Notify by email a person about badge activities until a specified time. Times are shown in local site time.

Trace
Name, Alias, or Badge
J|

- JS  Jack Smith jacsmi
  Badge no 221281
- Jackson Bowman jacbow
  Badge no 652630
- John Joyce jonjoy
  Badge no 123456
- JL Jhony Loonngerrrr Name jholoo
  Badge no 123456, 789123, 456123

3204

Notify
Name, Alias, or Email

3202

Expires on
Dec 28th, 2017

CREATE

There aren't any active badge traces yet.

Home
Trace
Maintenance

3100

Change the badge to trace
Name, Alias, or Badge
Jsdgsl

No results found

Trace

< Home

Badge Trace
Notify by email a person about badge activities until a specified time. Times are shown in local site time.

Trace
Name, Alias, or Badge

∨ More options

Active  Inactive

Notify
Name, Alias, or Email

Expires on
Dec 28th, 2017

CREATE

John Joyce johjoy
Badge no 123456
Created by Patricia Walker
Created on Nov 28th 2017 - 09:30
Expiry date Dec 28th 2017 - 23:59
Time remaining: 30 d

VIEW

Trace for John Joyce created. Active for 30 d    VIEW

Home
Trace
Maintenance

Trace

< Home

Badge Trace
Notify by email a person about badge activities until a specified time. Times are shown in local site time.

| Trace | Notify | Expires on |
|---|---|---|
| Name, Alias, or Badge | Name, Alias, or Email | Dec 28th, 2017 |

∨ More options — 4202

Active (Inactive)

(JJ) John Joyce johjoy
Badge no 123456
Created by Patricia Walker
Created on Nov 28th 2017 - 09:30
Expiry date Dec 28th 2017 - 23:59
Expand
VIEW

4204

4206

[CREATE]

Home | Trace | Maintenance

Badge Trace    ✉ 🗑  4702 / 4704

< Home    4706

Badge Trace details    ⏰ Expires in 12 hours
Notify by email a person about badge activities until a specified time. Times are shown in local site time.

Trace
This is the person that is being traced

| Name John Joyce | Card holder employer Pinkerton | |
| Alias v-jonjoy | Employee type Vendor | CHANGE |
| Badge no 123456 (active) | | |

4708

4718 — Home, Trace, Maintenance (sidebar)

Notify
This is the person to notify

| Patricia Walker patwal | Alias patwal | CHANGE |
| patricia.walker@company.com | Job title Technical operations supervisor | |

4720    4710

Expiry Date
After this date the trace will be inactive and notifications will stop Local site expiry date Dec 28th 2017 - 23:59 (GMT -8)    EDIT
On-site expiry date Dec 28th 2017 - 23:59 (GMT -8)

4722    4712

Building applied
If specified a notification is sent if the badge is being used in the given building Center, Redmond, Washington, USA    CHANGE

4724    4714

Additional information
Here you can add more information to the badge trace

Incident summary
John Joyce has been detected in the building, he is prohibited from entry.

Response instructions
Contact police, do not confront.

Incident summary
TOV - Threat of Violence

PPM
This notification was generated based on data of System A and has been recorded in System A.

Badge Trace review date
Badge trace was generated on 3/4/2018. The current notification was generated on 3/10/2018.

4726

EDIT    4716

FIG. 47

Incident summary
John Joyce has been detected in the building, he is prohibited from entry.

Response instructions
Contact police, do not confront.

Case Type
TOV - Threat of Violence

PPM
This notification was generated based on data of System A and has been recorded in System A.

Badge Trace review date
Badge trace was generated on 3/4/2018. The current notification was generated on 3/10/2018.

EDIT

― 5002

― 5004

Incident summary
Not specified

Response instructions
Not specified

Case Type
Not specified

PPM
Not specified

Badge Trace review date
Not specified

EDIT

Incident summary
John Joyce has been detected in the building, he is prohibited from entry.

Response instructions
Contact police, do not confront.

Incident summary
TOV - Threat of Violence ▼

PPM
This notification was generated based on data of System A and has been recorded in System A.

Badge Trace review date
Badge trace was generated on 3/4/2018. The current notification was generated on 3/10/2018.

5104

CANCEL    SAVE

5106

Incident summary
Describe reason for badge trace

Response instructions
Required actions in the event of a Badge Trace notification

Incident summary
Choose option from list ▼

PPM
Third party reference number

Badge Trace review date
When the Badge Trace should be reviewed and closed

CANCEL    SAVE

Incident summary
John Joyce has been detected in the building, he is prohibited from entry.

Response instructions
Contact police, do not confront.

Incident summary
TOV - Threat of Violence

PPM
This notification was generated based on data of System A and has been recorded in System A.

Badge Trace review date
Badge trace was generated on 3/4/2018. The current notification was generated on 3/10/2018.

Saved                                                              EDIT

Badge Trace

< Home

Badge Trace details  ⊙ Expired
Notify by email a person about badge activities until a specified time. Times are shown in local site time.

Trace
This is the person that is being traced

| Name John Joyce | Card holder employer Pinkerton | CHANGE |
| Alias v-jonjoy | Employee type Vendor | |
| Badge no 123456 (active) | | |

Notify
This is the person to notify

Patricia Walker patwal   Alias patwal   CHANGE
patricia.walker@company.com   Job title Technical operations supervisor

Expiry Date
After this date the trace will be inactive and notifications will stop Local site expiry date Dec 28th 2017 - 23:59 (GMT -8)   EDIT
On-site expiry date Dec 28th 2017 - 23:59 (GMT -8)

Building applied
If specified a notification is sent if the badge is being used in the given building Center, Redmond, Washington, USA   CHANGE

Additional information
Here you can add more information to the badge trace

Incident summary
John Joyce has been detected in the building, he is prohibited from entry.

Response instructions
Contact police, do not confront.

Incident summary
TOV - Threat of Violence

PPM
This notification was generated based on data of System A and has been recorded in System A.

Badge Trace review date
Badge trace was generated on 3/4/2018. The current notification was generated on 3/10/2018.

EDIT

Sidebar: Home | Trace | Maintenance

FIG. 52

Settings

MANAGED ALARMS

< Home

Managed alarms
Customise alarm settings and enable or disable managed alarms — 5312

( All )  ( Enabled )  ( Disabled )

Unauthorized use of an inactive badge
When an inactive badge is used once outside of local business hours or 6 times in 4 hours during local business hours, create a new alarm in the Fusion Center

Unauthorized use of a temporary badge
When a temporary badge is used once outside of local business hours or 6 times in 4 hours during local business hours, create a new alarm in the Fusion Center

Access denied limit exceeded
If any badge is denied 6 times in 4 hours during local business hours, create a new alarm in the Fusion Center

Door requires service
If a door triggers 15 Door Forced Opens (DFOs) in 10 seconds, create a new alarm in the Fusion Center and ignore all other events from this door for the next 72 hours

Person of Interest detection
If a badge associated with a Person of Interest (POI) is used, create a new alarm in the Fusion Center and send an email to selected recipients

FIG. 53

BUILDING SECURITY SYSTEM WITH ALARM LISTS AND ALARM RULE EDITING

CROSS-REFERENCE TO RELATED PATENT APPLICATIONS

This application is a continuation of U.S. patent application Ser. No. 16/665,990 filed Oct. 28, 2019, which claims the benefit of and priority to U.S. Provisional Patent Application No. 62/751,898 filed Oct. 29, 2018, the entireties of which are incorporated by reference herein.

BACKGROUND

The present disclosure relates generally to security systems. The present disclosure relates to security systems configured to centralize alarm management of one or multiple building sites.

The building sites may be located in different regions and/or countries. Centralizing the alarm management for individual building sites or groups of building sites can reduce required labor and cost for handling and responding to security and/or fire alarms. Furthermore, centralizing the alarm management can reduce security system costs while at the same time providing operators with a global view of the performance of the independent sites. For example, the total number of false alarms for a group of sites can be obtained from the centralized alarm management system. However, centralized security systems may encounter challenges when extracting data insights from centralized data from the independent sites. In particular, the centralized alarm management systems may encounter difficulty creating high level, actionable summaries providing high value in identifying issues and opportunities since groupings of the sites may be unknown. Furthermore, security operates may have difficulty parsing large volumes of information at the centralized security system.

SUMMARY

One implementation of the present disclosure is a building security system. The system includes one or more memory devices configured to store instructions, that when executed on one or more processors, cause the one or more processors to receive, for each of multiple alarm rules, one or more alarm rule parameters for each of the alarm rules from a user device and receive security system data from a security system. For each alarm rule of the alarm rules the instructions cause the one or more processors to perform operations including determining, based on the one or more alarm rule parameters for the alarm rule, whether the alarm rule is triggered by the security system data and generating an alarm for the alarm rule in response to determining that the alarm rule is triggered.

In some embodiments, the instructions cause the one or more processors to receive an indication of one or more active alarm rules and one or more inactive alarm rules of the alarm rules from the user device.

In some embodiments, the instructions cause the one or more processors to generate a user interface, the user interface including an indication of each of the alarm rules and an interface element for each of the alarm rules to activate or deactivate each of the alarm rules.

In some embodiments, the instructions cause the one or more processors to generate a parameter adjustment interface including one or more editable attributes defining the one or more alarm rule parameters for each of the alarm rules and receive the one or more alarm rule parameters from the parameter adjustment interface.

In some embodiments, the alarm rules include an inactive badge alarm rule, the inactive badge alarm rule being triggered in response to at least one of the security system data indicating that an inactive badge was used with the security system a first predefined number of times outside of local business hours or the security system data indicating that the inactive badge was used a second predefined number of times with the security system within a predefined period of time and within the local business hours. In some embodiments, the first predefined number of times, the second predefined number of times, and the predefined period of time are the one or more alarm rule parameters for the inactive badge alarm rule.

In some embodiments, the alarm rules include a temporary badge alarm rule, the temporary badge alarm rule being triggered in response to at least one of the security system data indicating that a temporary badge was used with the security system a first predefined number of times outside of local business hours or the security system data indicating that the temporary badge was used a second predefined number of times with the security system in a predefined period of time within the local business hours. In some embodiments, the first predefined number of times, the second predefined number of times, and the predefined period of time are the one or more alarm rule parameters for the temporary badge alarm rule.

In some embodiments, the alarm rules include an access denied alarm rule, the access denied alarm rule being triggered in response to the security system data indicating that a badge was used and denied with the security system a predefined number of times within a predefined period of time outside of local business hours. In some embodiments, the predefined number of times and the predefined period of time are the one or more alarm rule parameters for the access denied alarm rule.

In some embodiments, the alarm rules include a door service alarm rule, the door service alarm rule being triggered in response to the security system data indicating that a predefined number of door forced open (DFO) events for a particular door monitored by the security system have occurred within a predefined time period. In some embodiments, the instructions cause the one or more processors to stop generating a door service alarm for the door service alarm rule for a second predefined length of time in response to the door service alarm rule being triggered.

In some embodiments, the alarm rules include a person of interest alarm rule, the person of interest alarm rule being triggered in response to the security system data indicating that a badge associated with a person of interest has been used with the security system. In some embodiments, the instructions cause the one or more processors to perform at least one of generating a new alarm and sending an email notification to one or more email recipients in response to the person of interest alarm rule triggering, generating the new alarm, or sending the email notification to the one or more email recipients.

Another implementation of the present disclosure is a building security system. The system includes one or more memory devices configured to store instructions, that when executed on one or more processors, cause the one or more processors to receive security data from a security system, the security data indicating alarms, generate, based on the security data, a list of the alarms by sorting the alarms based on a user selected sorting parameter received from a user device, generate a user interface including the list of the alarms, and cause the user device to display the user interface including the list of the alarms.

In some embodiments, the instructions cause the one or more processors to receive new security data from the security system, the new security data received at a particular time indicating one or more new alarms, generate a new alarm indicator including an indication of the particular time, cause the user interface to include the new alarm indicator, receive, from the user device, an interaction with the new alarm indicator, re-generate, based on the security data and the new security data, the list by sorting the alarms and the one or more new alarms based on the user selected sorting parameter, and cause the user interface to include the list.

In some embodiments, the user selected sorting parameter include at least one of a dynamic priority sorting parameter, a severity sorting parameter, a date and time sorting parameter, and alarm type sorting parameter, or a device name sorting parameter.

In some embodiments, the user selected sorting parameter includes one or more geographic regions, wherein each of the alarms is associated with the one or more geographic regions of the user selected sorting parameter or one or more other geographic regions.

In some embodiments, instructions cause the one or more processors to receive an interaction with one alarm of the alarms of the list from the user device, generate one or more options for handling the one of the alarms based on an access level of the user device, and cause the user interface to include the one or more options.

In some embodiments, the one or more options are a first option set associated with a first access level, wherein the one or more options include an accept option and a close option. In some embodiments, the instructions cause the one or more processors to assign the one alarm to the user device in response to receiving a first interaction with the accept option when no other user devices have been assigned to the one alarm and close the one alarm in response to receiving a second interaction with the close option and in response to the one alarm being assigned to the user device.

In some embodiments, the one or more options are a second option set associated with a second access level higher than the first access level, wherein the one or more options include an second accept option, a second close option, and a select option. In some embodiments, the instructions cause the one or more processors to assign the one alarm to the user device in response to receiving a first interaction with the second accept option when no other user devices have been assigned to the one alarm, close the one alarm in response to receiving a second interaction with the second close option and even when the one alarm has not been assigned to the user device, and perform one or more bulk actions on the one alarm and one or more other alarms of the alarms in response to receiving a third interaction with the select option of the one alarm and in response to receiving other interactions with other select options associated with the one or more other alarms.

Another implementation of the present discourse is a method of customizing security system rules. The method includes receiving, by a processing circuit, for each of alarm rules, one or more alarm rule parameters for each of the alarm rules from a user device, receiving, by the processing circuit, security system data from a security system, and for each alarm rule of the alarm rules determining, by the processing circuit, based on the one or more alarm rule parameters for the alarm rule, whether the alarm rule is triggered by the security system data and generating, by the processing circuit, an alarm for the alarm rule in response to determining that the alarm rule is triggered.

In some embodiments, the alarm rules include a temporary badge alarm rule, the temporary badge alarm rule being triggered in response to at least one of the security system data indicating that a temporary badge was used with the security system a first predefined number of times outside of local business hours or the security system data indicating that the temporary badge was used a second predefined number of times with the security system in a predefined period of time within the local business hours. In some embodiments, the first predefined number of times, the second predefined number of times, and the predefined period of time are the one or more alarm rule parameters for the temporary badge alarm rule.

In some embodiments, the alarm rules include an access denied alarm rule, the access denied alarm rule being triggered in response to the security system data indicating that a badge was used and denied with the security system a predefined number of times within a predefined period of time outside of local business hours. In some embodiments, the predefined number of times and the predefined period of time are the one or more alarm rule parameters for the access denied alarm rule.

In some embodiments, the method includes receiving, by the processing circuit, site data for sites, the site data indicating the geographic location of each of the sites and performing, by the processing circuit, a clustering technique on the site data by generating, by the processing circuit, clusters and classifying, by the processing circuit, each of the sites into one of the clusters.

Another implementation of the present disclosure is a building security system, the system including one or more memory devices configured to store instructions, that when executed on one or more processors, cause the one or more processors to receive site data for sites, the site data indicating the geographic location of each of the sites and perform a clustering technique on the site data to generate clusters and classify each of the sites into one of the clusters.

In some embodiments, the instructions cause the one or more processors to receive site performance data indicating the performance of each of the sites and generate performance metrics for each of the clusters based on the site performance data of sites belonging to each of the clusters.

In some embodiments, the clustering technique is a density-based spatial clustering of applications with noise (DBSCAN) technique, wherein the instructions cause the one or more processors to receive one or more DBSCAN parameters and perform the DBSCAN technique on the site data with the one or more DBSCAN parameters.

In some embodiments, the one or more DBSCAN parameters include a minimum points parameter indicating a minimum number of the sites required for one of the clusters and an epsilon parameter indicating a maximum distance between points for one of the clusters.

Another implementation of the present disclosure is a building security system. The system includes one or more memory devices configured to store instructions, that when executed on one or more processors, cause the one or more processors to receive user activity information for a user from a security system, determine whether the user activity information triggers a user activity trace for the user, generate a notification indicating the user activity information in response to a determination that the user activity information triggers a user activity trace for the user and cause the notification to be sent to one or more recipient users to notify the one or more recipient users of the user activity information.

In some embodiments, the instructions cause the one or more processors to receive badge trace information for a badge trace, the badge trace information identifying the user and the email recipients and generate the notification based on the received badge trace information.

In some embodiments, the instructions cause the one or more processors to receive an expiration time for the badge trace, wherein the expiration time indicates a time at which the badge trace should end, determine whether the expiration time has occurred, and generate the notification in response to a determination that the expiration time has not occurred.

In some embodiments, the instructions cause the one or more processors to label badge traces as either active or inactive based on a current time and an expiration time associated with each of the badge traces, generate a user interface including an active badge trace view and an inactive badge trace view, cause the user interface to display one or more of the badge traces that are active in the active badge trace view, and cause the user interface to display one or more of the badge traces that are inactive in the inactive badge trace view.

In some embodiments, the notification is an email notification. In some embodiments, the instructions cause the one or more processors to cause the email notification to be emailed to the one or more recipient users.

In some embodiments, the user activity is access badge activity of a user performed with an access badge of the user.

In some embodiments, the email notification includes a summary interface element, the summary interface element including an indication of a name of the user and an indication of an access badge number associated with the user and an indication of a device of the security system that the user interacted with to generate the user activity information.

In some embodiments, the email notification includes a case details interface element, the details interface element including an indication of the user, an indication of an employer associated with the user, and an indication of an employment type of the user with the employer and an indication describing the user activity, a device of the security system that the user performed the user activity with, a building where the device is located, and an address of the building.

In some embodiments, the instructions cause the one or more processors to retrieve email addresses for the one or more recipient users based on the activity trace and email the email notification to the retrieved email addresses.

In some embodiments, the email notification includes a case management interface element, the case management interface element including an incident summary describing the user activity information and response instructions describing one or more steps to perform in response to receiving the email notification.

In some embodiments, the instructions cause the one or more processors to generate a user interface including one or more input elements, receive, via the one or more input elements of the user interface, the incident summary and the response instructions, generate a badge trace data structure including the incident summary and the response instructions, and generate the email notification based on the badge trace data structure.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 6 is a table illustrating performance metrics of the clusters of FIG. 5 that can be generated by the security alarm system illustrated in FIG. 2, according to an exemplary embodiment.

FIG. 17 is the interface illustrated in FIG. 7 indicating that a security event cannot be accepted, according to an exemplary embodiment.

FIG. 20 is a drawing of interface elements for closing a security event, according to an exemplary embodiment.

Figure 22:
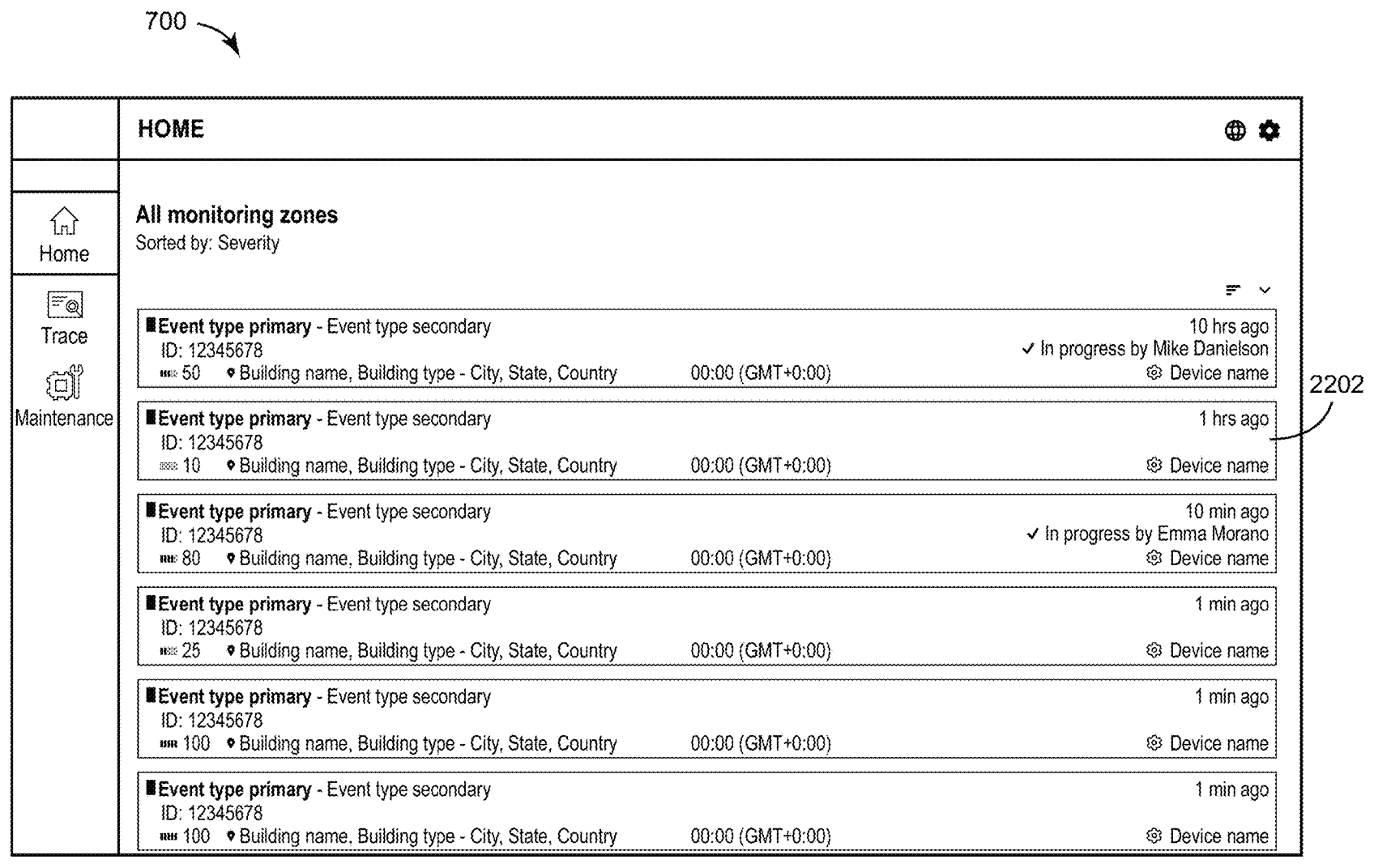

FIG. 22 is the interface illustrated in FIG. 7 illustrating selecting one or multiple of the security events, according to an exemplary embodiment.

FIG. 24 is the interface illustrated in FIG. 7 illustrating multiple of the security events being selected, according to an exemplary embodiment.

FIG. 26 is the interface illustrated in FIG. 7 including an indication that the multiple selected security events illustrated in FIGS. 24 and 25 are successfully closed, according to an exemplary embodiment.

FIG. 28 is an interface element for a security event, according to an exemplary embodiment.

FIG. 30 is an email generated by the building security system illustrated in FIG. 2 for a badge trace, according to an exemplary embodiment.

FIG. 32 is the interface illustrated in FIG. 31 including a user selection element for selecting a user to be traced for the badge trace, according to an exemplary embodiment.

FIGS. 35-38 are the interface illustrated in FIG. 31 including additional options for generating the badge trace, according to an exemplary embodiment.

FIGS. 40-42 are the interface illustrated in FIG. 31 including an indication of active badge traces and inactive badge traces, according to an exemplary embodiment.

FIG. 43-45 are the interface illustrated in FIG. 31 illustrating a user scrolling up and down, according to an exemplary embodiment.

FIG. 46 is the interface illustrated in FIG. 31 including an indication of a new badge trace being generated, according to an exemplary embodiment.

FIG. 47 is an interface managed by the building security system illustrated in FIG. 2 including information of a badge trace, according to an exemplary embodiment.

FIG. 50 are interfaces including badge trace information that has been specified by a user and a badge trace where information has not been specified by the user, according to an exemplary embodiment.

FIG. 51 are interfaces illustrating information for a badge trace being edited and saved by a user, according to an exemplary embodiment.

FIG. 52 is an interface illustrating details for a badge trace that can be deleted or edited, according to an exemplary embodiment.

FIG. 53 is an interface for turning particular alarms on or off by a user that can be managed by the building security system illustrated in FIG. 2, according to an exemplary embodiment.

DETAILED DESCRIPTION

Overview

Figure 1:
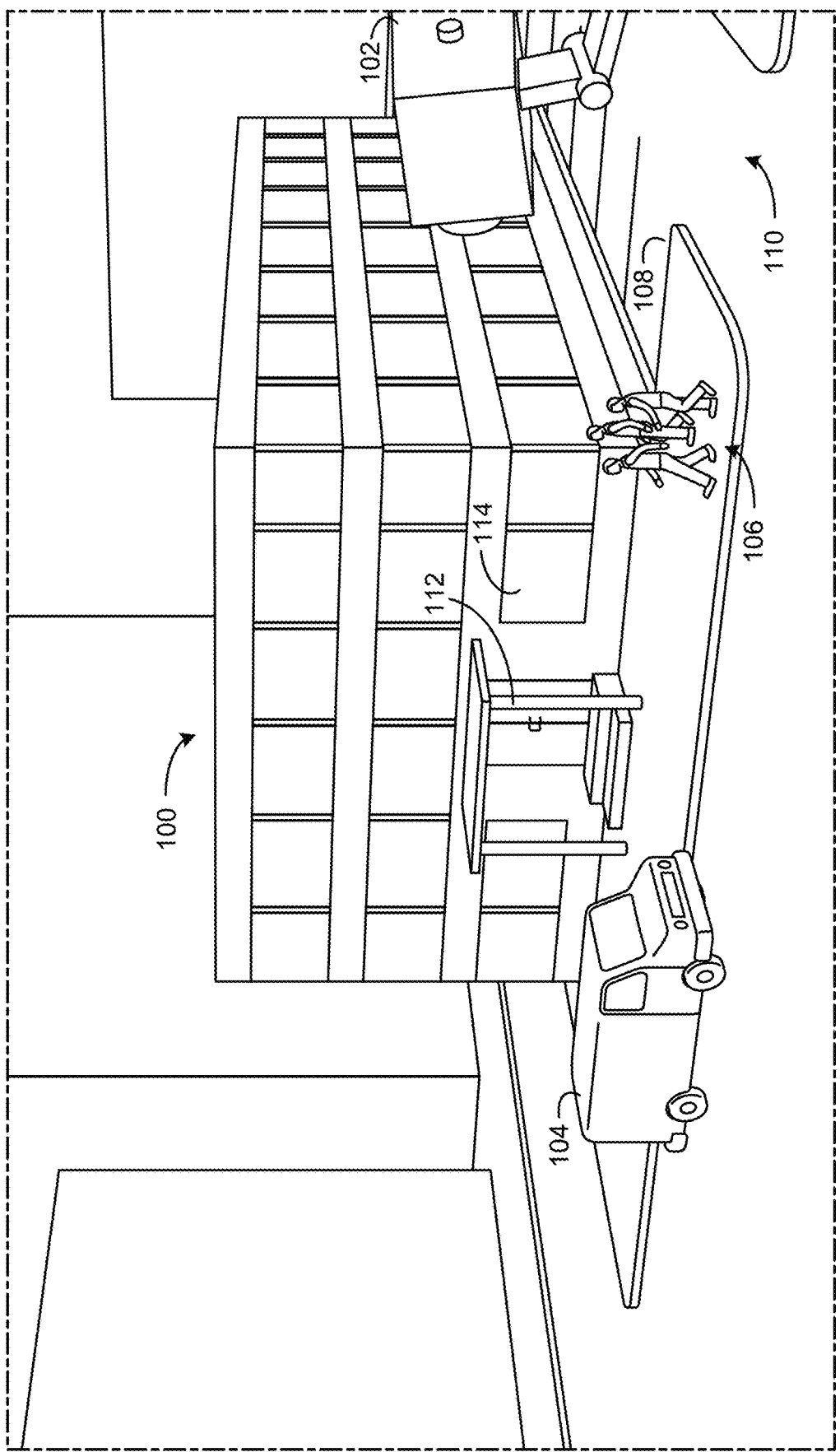
FIG. 1 is a perspective view schematic drawing of a building with a security system, according to an exemplary embodiment.

Referring generally to the FIGURES, systems and methods for a security alarm system are shown, according to various exemplary embodiments. The security system is configured to receive security data for one or multiple building sites i.e., the security system can be a centralized security system, in some embodiments. Based on the received security data, the security system is configured to generate user interfaces for presentation of information determined from the security data to an end user, in some embodiments. For example, the security system is configured to generate metrics based on site groupings indicating performance of multiple sites based on the site groupings, generate alarm lists prioritizing alarms for end users, facilitate badge traces where users can be tracked through one or multiple buildings, and generate alarms based on custom user alarm rule parameters.

Software based improvements can be realized from the site grouping systems and methods described herein. Since site grouping provides a method for categorizing data together based on sites, information can be extracted from the data to identify site group performance that would otherwise be difficult to extract if the sites and site data were not grouped. Furthermore, improvements can be realized through the alarm list interfaces. Specifically, user interfaces for security systems can be improved by implementing the alarm listing techniques as described herein. The alarm list of the security user interfaces as described herein allow a user to view alarms that are important without being inundated with a high volume of alarms which may impair a user interface from presenting relevant information to a user.

Furthermore, the badge tracing techniques that allow the generation and automatic sending of emails. Even when a security advisor is not monitoring an interface for a person to track, the security advisor can receive an email notification when particular activity of the person to track is detected. The alarm rule editing user interfaces permit a user to configure alarms of a security system. The parameters that the user can provide are integrated into the system via a user interface, allowing the system to operate based on rules that improve the operation of alarm generation.

Site Groupings

The security system is configured to generate site level metrics but also site group metrics based on the security data, in some embodiments. However, the security system may require a definition of what sites belong to what groups to be able to generate group level metrics. For a large number of building sites, e.g., for a chain of restaurants, department stores, etc., it may be difficult and time consuming for a user to manually define each grouping of sites. In this regard, the security system is configured to automatically generate site groupings of the sites and utilize the site groupings and data for each group to generate site level metrics, in some embodiments. The security system is configured to implement clustering methods e.g., density-based spatial clustering of applications with noise (DB-SCAN), K-mean squared (where K defines the number of clusters), and/or any other clustering method in various embodiments.

Alarm Lists

The security system can be configured to receive a high volumes of security alarms. Security operators using the security system may be handling numerous alarms and alerts on a daily basis. Effectively sorting and responding to alarms and alerts requires human investigation and decision making. In this regard, the security system can provide user interface alarm list tools to aid security operators and help the security operators focus on the most relevant alarms and alarm information so that the security operators can respond to alarms appropriately in a shorter time. The security system is configured to generate user interfaces that present alarms for sites prioritized in particular orders in some embodiments. Furthermore, the security system is configured to implement mechanisms for multiple users to monitor the site lists and manage which users deal with particular alarms in some embodiments.

Badge Trace and Badge Trace Emails

The security system is further configured to implement a badge trace to help track particular users through buildings, in some embodiments. A badge trace can be a mechanism used in a monitoring system whereby security operators can monitor the activities of a badge user. Badge traces can be created when, for example, a badge holder has been identified as presenting a potential security risk. In order to take timely and appropriate action in response to certain badge actives to the badge holder, security operators benefit from a notification system and interface, presenting them with the most relevant, useful information and actions that the security system is configured to generate, in some embodiments. Tracking the user of identity badges is only one method of identity tracking. A user may also be tracked within the monitored area using other technologies, such as face recognition, number plate recognition, biometric data, or any other method of identity detection.

When access or identification (ID) badges interact with access control or monitoring assets, there is an opportunity for security systems to track the activity of individuals (or their badges) for various security reasons. For example, the use of a badge that has been reported lost or stolen is an indication of suspicious activity, such as a potential intruder. In a "person of interest" case, tracing the badge use of a valid badge holder may be useful to comply with a restraining order affecting that person and another person located within the monitored area. Tracking the use of ID badges is only one method of identity tracking. An identity of a person may also be tracked within the monitored area using other technologies, such as face recognition, number plate recognition, biometric data, or any other method of identity detection.

The security system is configured to generate email notifications for particular users to convey urgent notifications to security personnel, in some embodiments. For example, the security system is configured to store particular contact individuals associated with a badge trace. In response to detecting, via security system data, information of a particular user for the badge trace, the security system is configured to generate and send an email to the contact individuals, in some embodiments.

Alarm Rule Editing

The security system can include, or be connected with, an access control system (ACS). The ACS can be configured to protect access to building access points (e.g., doors), both internally within a building or external to the building. The ACS can be used to manage and monitor groups of buildings in disparate locations and across a large campus. Managing an ACS is a non-trivial task. A large ACS will contain a large number of sensors and, consequently a large amount of sensor data in the form of access events and alarms. Security operators are responsible for responding to, and resolving, alarm events in a timely fashion, to ensure that the building safety is maintained and the building occupants are not impeded by the ACS. Traditionally, security operators are shown alarms as independent events without contextual information.

Alarm events, when viewed as part of a trend, or with more contextual information, could have a higher actual significance than that of their isolated occurrence. For example, in isolation, an access denied event could have a low significance. If, however, a series of access denied events occurs within a short amount of time and outside of business hours, the significance of the series of events could be very high, possibly indicating an attempted intrusion. Traditional ACS generally do not provide any mechanism to cluster related system events and synthesize new alarms to represent these clusters. Security advisors, who manage security operators, need an efficient way to configure the system to identify and create alerts to highlight non-obvious and complex patterns of events.

In this regard, the security system is configured to monitor events of an ACS and/or any other security system and generate alarms based on rules defining particular patterns for the events in some embodiments. Rules may indicate that a particular numbers of events that occur within particular windows of times should generate alarms. The rules may further include various parameters (e.g., number of event occurrence, time period, etc.) for both working hours (e.g., 9 A.M. to 5 P.M.) or non-working hours (5 P.M. to 9 A.M.). In some embodiments, the security system is configured to generate user interfaces presenting indications of the rules to a security operator and allow the security operator to manually define values for the parameters of the rules.

Building Security System

Referring now to FIG. 1, a building 100 with a security camera 102 and a parking lot 110 is shown, according to an exemplary embodiment. The building 100 is a multi-story commercial building surrounded by, or near, the parking lot 110 but can be any type of building in some embodiments. The building 100 may be a school, a hospital, a store, a place of business, a residence, a hotel, an office building, an apartment complex, etc. The building 100 can be associated with the parking lot 110.

Both the building 100 and the parking lot 110 are at least partially in the field of view of the security camera 102. In some embodiments, a multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. delivery vehicles). The building 100 and parking lot 110 can be further used by one or more pedestrians 106 who can traverse the parking lot 110 and/or enter and/or exit the building 100. The building 100 may be further surrounded, or partially surrounded, by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

Alarm and Risk Management Interfaces

Figure 2:
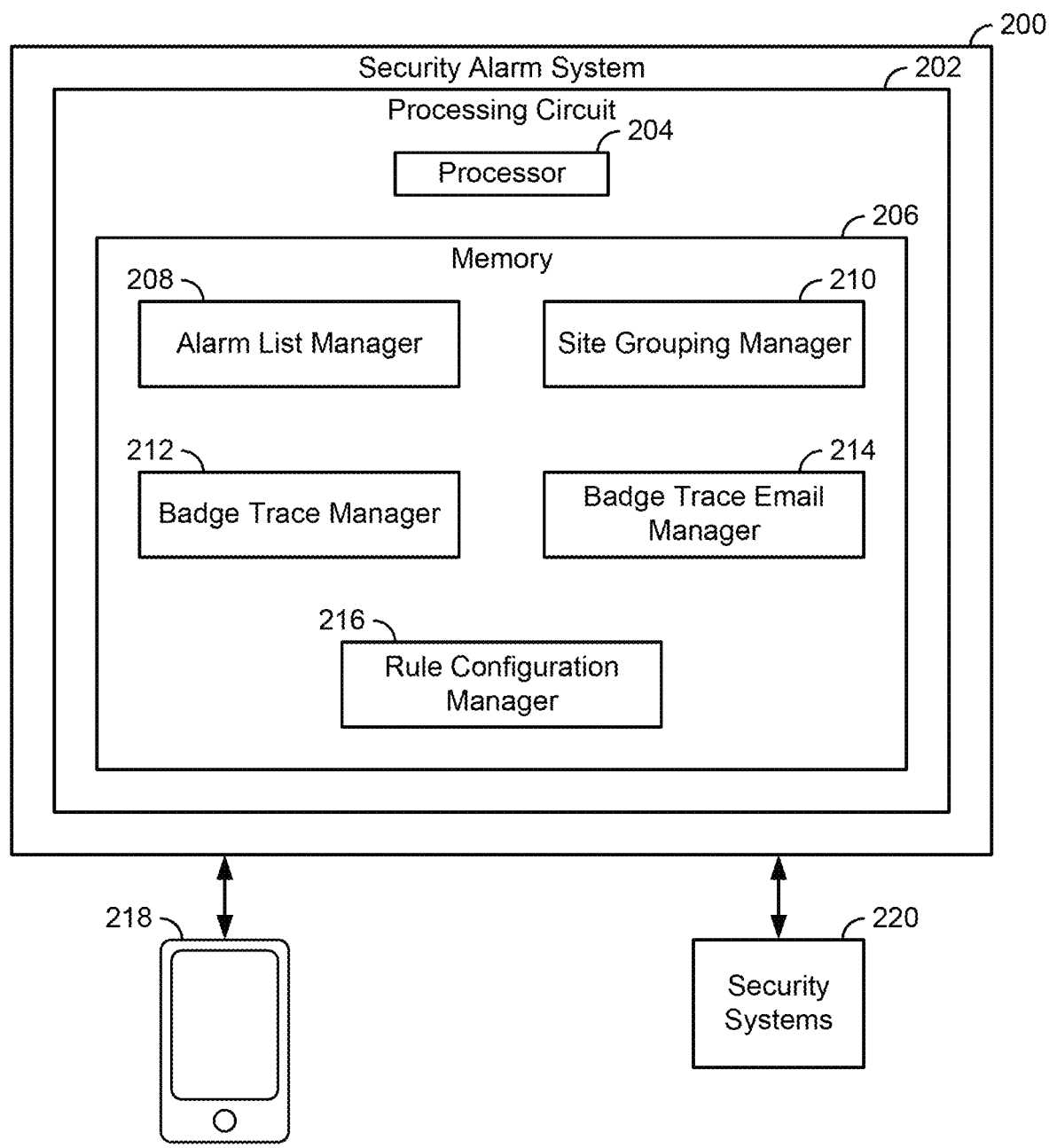
FIG. 2 is a block diagram of a security alarm system for the building illustrated in FIG. 1, according to an exemplary embodiment.

Referring now to FIG. 2, a security alarm system 200 is shown for managing alarms for one or multiple building sites, according to an exemplary embodiment. The security alarm system 200 can be implemented at, or remote from, a building site and can be configured to perform alarm management for the building site. In some embodiments, the security alarm system 200 is implemented for a building e.g., the building 100 as described with reference to FIG. 1. Furthermore, the security alarm system 200 can be implement with, or otherwise connected to, the security systems of the building 100 as described with reference to FIG. 1.

The security alarm system 200 is shown to include a processing circuit 202. The processing circuit 202 includes a processor 204 and a memory 206. The security alarm system 200 can be implemented in a server, multiple servers, a cloud computing platform (e.g., MICROSOFT AZURE®, AMAZON WEB SERVICES®, etc.), a controller, via microservices across multiple computing devices, and/or on (or distributed across) any other computing device or system. In some embodiments, the security alarm system 200 is implemented via the processing circuit 202 (e.g., a memory and/or a processor) and/or implemented across multiple processing circuits 202 (e.g., multiple memories and/or processors).

The processor 204 can be a general purpose processor, an application specific integrated circuit (ASIC), one or more field programmable gate arrays (FPGAs), a group of processing components, or other suitable electronic processing components.

The memory 206 can include one or more devices (e.g., memory units, memory devices, storage devices, etc.) for storing data and/or computer code for completing and/or facilitating the various processes described in the present disclosure. The memory 206 can include random access memory (RAM), read-only memory (ROM), hard drive storage, temporary storage, non-volatile memory, flash memory, optical memory, or any other suitable memory for storing software objects and/or computer instructions. The memory 206 can include database components, object code components, script components, or any other type of information structure for supporting the various activities and information structures described in the present disclosure. The memory 206 can be communicably connected to the processor 230 via the processing circuit 202 and can include computer code for executing (e.g., by the processor 204) one or more processes described herein.

The security alarm system 200 is configured to communicate with (e.g., send to, receive from, retrieve from, push to, pull from, etc.) user device 218 and/or security systems 220 in some embodiments. The security alarm system 200 is configured to cause the user device 218 to generate and/or display user interfaces managed by the security alarm system 200 in some embodiments. Furthermore, the security alarm system 200 is configured to send messages (e.g., email messages, text messages, mobile application notifications, etc.) to the user device 218, in some embodiments. The security alarm system 200 is configured to receive security data (e.g., alarms, security device events, etc.) the security systems 220, in some embodiments. The security systems 220 can be access control systems (e.g., camera monitoring systems, badge access control systems, etc.).

In some embodiments, the security alarm system 200 is configured to communicate with the user device 218 and/or the security systems 220 via one or multiple networks. The networks can include routers, modems, cellular towers, transmitters, receivers, transceivers, coordinators, servers, and/or any other hardware device to implement the network. The network can be a LAN, WAN, MAN, and/or any other network. Examples of the network are the Internet, BACnet, CAN, Wi-Fi, Zigbee, Bluetooth, and/or any other network.

The memory 206 includes an alarm list manager 208, a site grouping manager 210, a badge trace manager 212, a badge trace email manager 214, and a rule configuration manager 216. Each of the managers 208-216 are configured to receive data from the security systems 220 and/or cause the user device 218 to display information (e.g., user interfaces), in some embodiments. The site grouping manager 210 is configured to receive site information and generate groupings of sites based on location, in some embodiments. The alarm list manager 208 is configured to generate user interfaces displaying alarms in a particular order, in some embodiments. Examples of the interfaces that the alarm list manager 208 are the interfaces shown in FIGS. 7-29.

Figure 54:
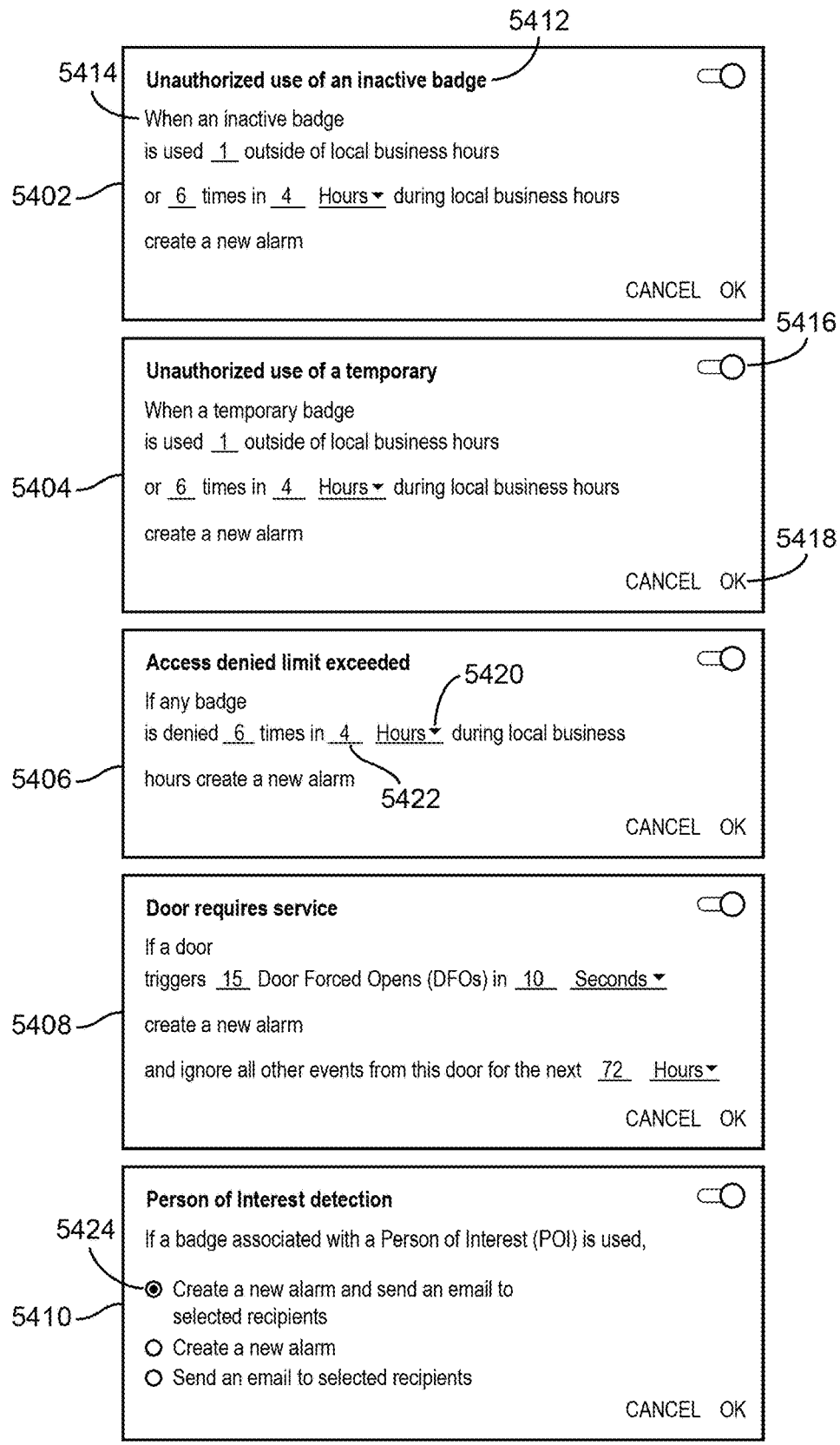
FIG. 54 are interface elements for adjusting the parameters of the alarms illustrated in FIG. 52, according to an exemplary embodiment.

The badge trace email manager 214 is configured to generate email notifications based on badge traces performed by the badge trace manger 212. An example of an email that the badge trace email manager 214 can generate is the interface shown in FIG. 29. The badge trace manager 212 can be configured to perform a badge trace, i.e., track a user through a site or across multiple sites based on an access card. The badge trace manager 212 can generate interfaces for setting up and/or managing a badge trace. Examples of the interfaces for a badge trace are shown in FIGS. 31-52. The rule configuration manager 216 is configured to implement custom alarm rules for generating alarms based on data collected and/or received from the security systems 220 in some embodiments. Examples of the interfaces for configuring the rules operated by the rule configuration manager 216 are shown in FIGS. 53 and 54.

Site Grouping

Still referring to FIG. 2, the site grouping manager 210 can be configured to receive locations of multiple different sites pertaining to a particular entity and generate, based on the locations of the sites, groupings of the sites. The site grouping manager 210 can receive the data from the various sites (e.g., from the security systems 220), from a user via a user device (e.g., the user device 218), from a database, and/or any other data storage and/or input device. A particular entity (e.g., a chain of stores, schools of a particular state, bank locations of a bank chain, etc.), may perform metrics based on groupings of their sites. The site grouping manager 210 can be configured to generate the site groupings by performing various grouping algorithms and generate metrics based on the performance of the sites and/or site groupings. In some embodiments, the site grouping manager 210 can generate a hierarchical level of groupings. For example, the site grouping manager 210 could generate three clusters of site data and then subdivide each of the three clusters into multiple sub-clusters.

The site grouping manager 210 can implement a data-driven solution that automatically groups (e.g., performs a clustering algorithm) alarm monitored sites by geographic location to better represent regions and provide a mechanism for extracting useful insights for an end user. The site grouping manager 210 is configured to perform a clustering mechanism to automatically identify regional data from large data sets, in some embodiments. The site grouping manager 210 can generate site and/or cluster metrics to aid a user with decision making for geographically similar sites. For example, a region could be affected by similar weather conditions. Understanding which sites will be similarly affected by, for example, environmental conditions, helps to contextualize alarm events to aid in the user decision making.

In some embodiments, the site grouping manager 210 is configured to provide an interface to the user device 218 for allowing a user to manually define a geographic region for site grouping. In some embodiments, the user can manually assign particular sites to particular site groups via the interface. In some embodiments, the site grouping manager 210 is configured to receive district information (e.g., country, state, county, city, etc.) and generate the regions at least in part based on the district data.

The site grouping manager 210 is configured to perform a clustering technique such as the density-based spatial clustering of applications with noise (DBSCAN) algorithm to automatically cluster together sites and identify natural regions. Although DBSCAN is one particular clustering algorithm that the grouping manager 510 can implement, other algorithms e.g., K-Means Clustering, Mean-Shift Clustering, Expectation—Maximization (EM) Clustering using Gaussian Mixture Models (GMM), and/or any other clustering algorithm can be implemented by the grouping manager 510.

The grouping manager 510 is configured to utilize the DBSCAN algorithm using geographical coordinates as inputs to the DBSCAN algorithm and produce a clustered index that groups geographically similar locations, according to some embodiments. The algorithm is tuned using a minimum points parameter and an epsilon parameter. The minimum points parameter defines the minimum number of points that is required for a cluster. The epsilon is the maximum distance between points.

Using the minimum points parameter and the epsilon parameter, the site grouping manager 210 is configured to classify each location coordinate as being a core-point, an edge point, or noise. The site grouping manager 210, when using the DBSCAN algorithm, does not require the number of clusters to be predefined, is robust to outliers, and can find arbitrarily shaped clusters.

Figure 3:
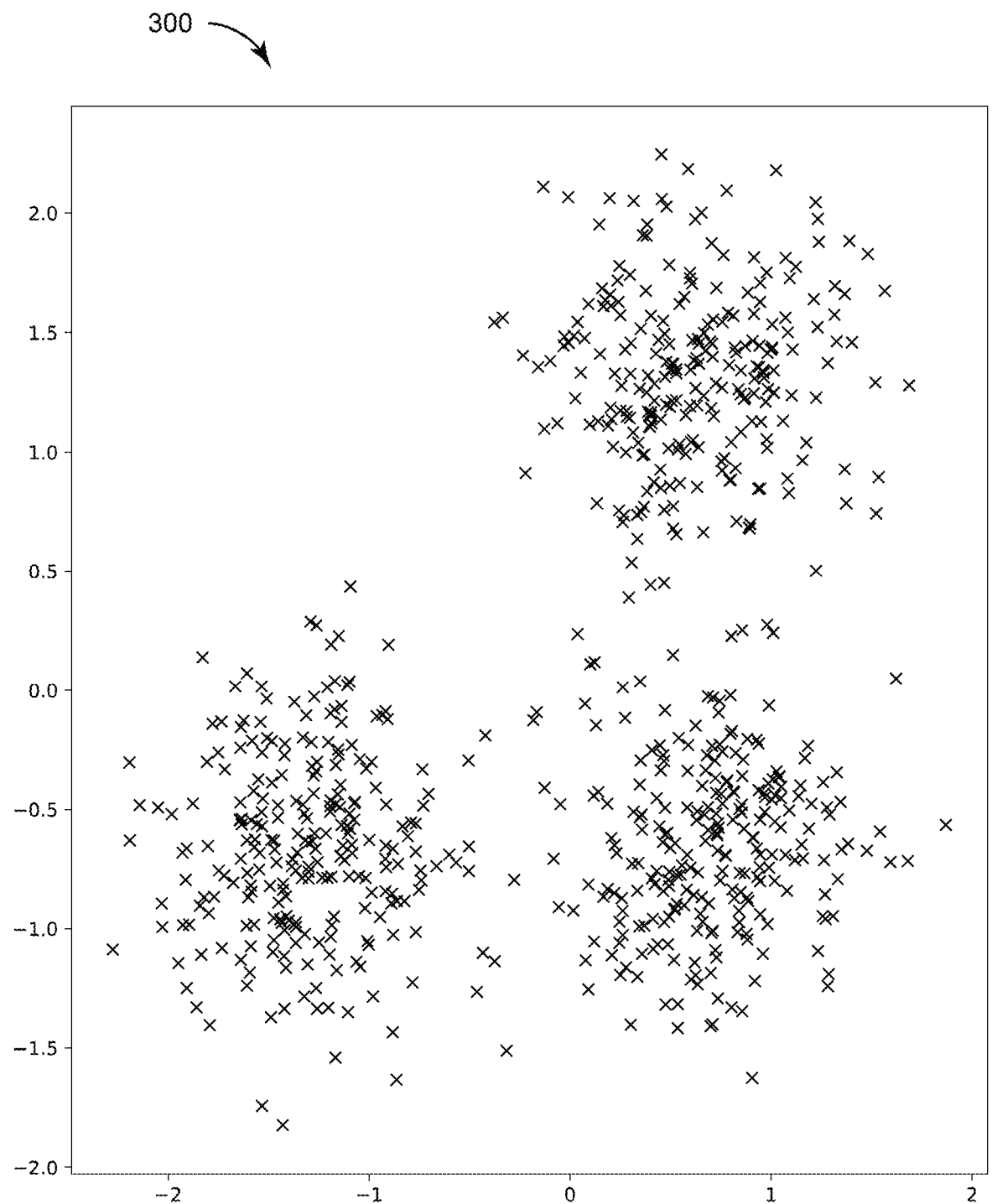
FIG. 3 is a drawing of building site coordinates of multiple buildings, the buildings being the same as or similar to the building illustrated in FIG. 1, according to an exemplary embodiment.

Referring now to FIG. 3, a chart 300 is shown indicating locations of multiple sites, according to an exemplary embodiment. The "x" markers of the chart 300 indicate locations of sites of a particular entity. An entity can be a particular store owner that owns multiple different store locations. Furthermore, the entity could be a company. To example, a coffee shop company could be an entity associated with multiple different coffee shops or a grocery store chain could be associated with multiple different grocery store locations. The sites are shown at particular coordinates (e.g., latitude, longitude, etc.). The data represented in the chart 300 can be the input data that the site grouping manager 210 is configured to utilize to perform clustering with. In some embodiment, the data of the chart 300 is simulated raw coordinate data generated by the site grouping manager 210. In some embodiment, the data of the chart 300 is real data and can be received from a database, the user device 218, and/or self-reported from building sites (e.g., from security systems of the building sites themselves).

Figure 4:
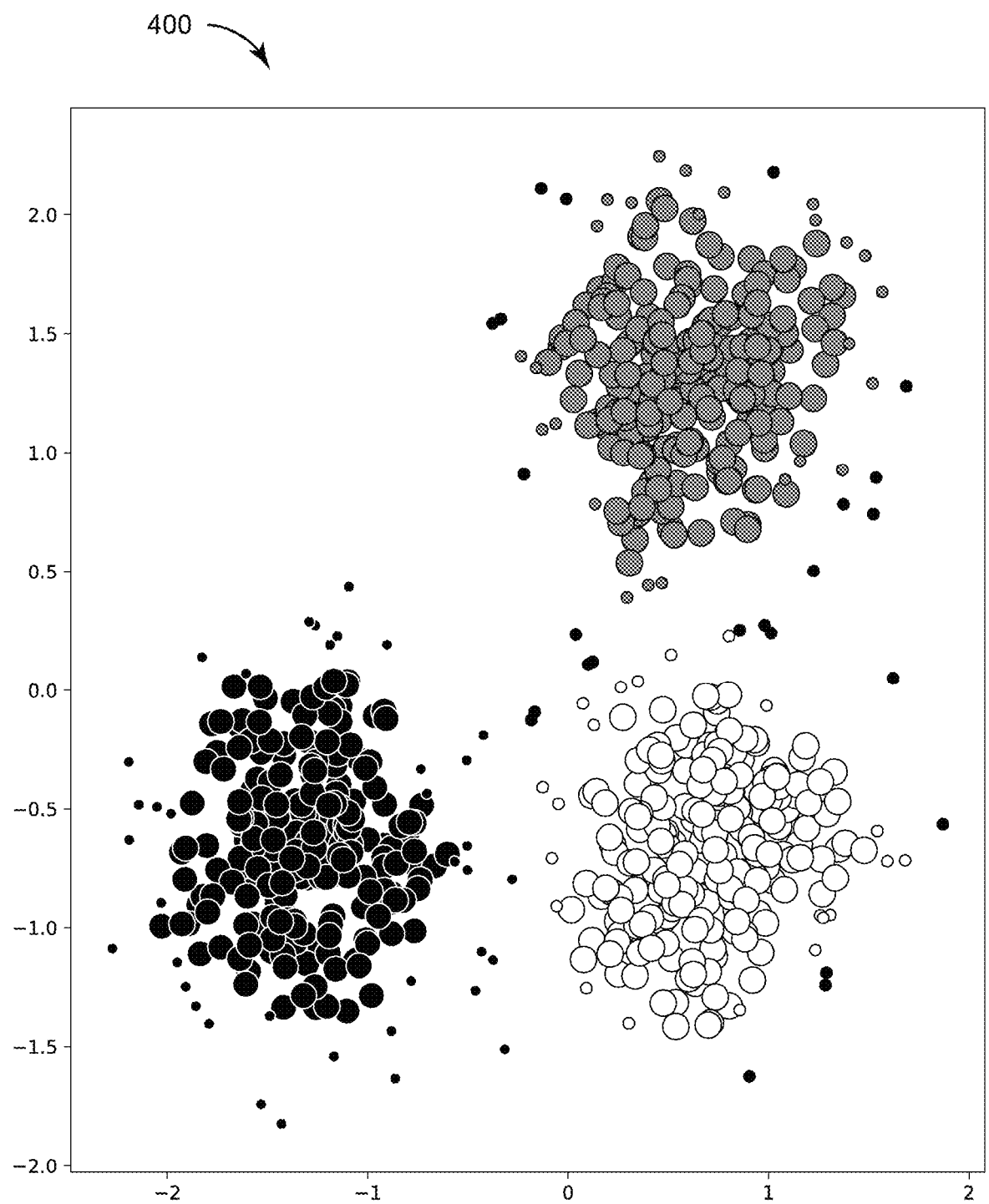
FIG. 4 is a drawing of the building site coordinates of FIG. 3 grouped into clusters by the security alarm system illustrated in FIG. 2, according to an exemplary embodiment.

Referring now to FIG. 4, a chart 400 is shown indicating the data of the chart 300 clustered into three clusters, according to an exemplary embodiment. The clusters of the chart 400 are represented by three different colors, red, yellow, and green. The black markers indicate noise while the small green, red, and yellow markers indicated edge locations. The clusters of the chart 400 (i.e., the classification of sites represented in the chart 400) can be generated by the site grouping manager 210. The site grouping manager 210 can perform a grouping algorithm on the data of the chart 300, e.g., the DBSCAN algorithm, to generate the site classification of the chart 400. The site grouping manager 210 can classify each of the sites of the chart 300 into one of multiple categories (in the example of FIGS. 3-4, into one of three categories) and/or as noise. By performing the grouping algorithm, the site grouping manager 510 can not only classify the sites but determine the number of classification clusters to utilize.

Figure 5:
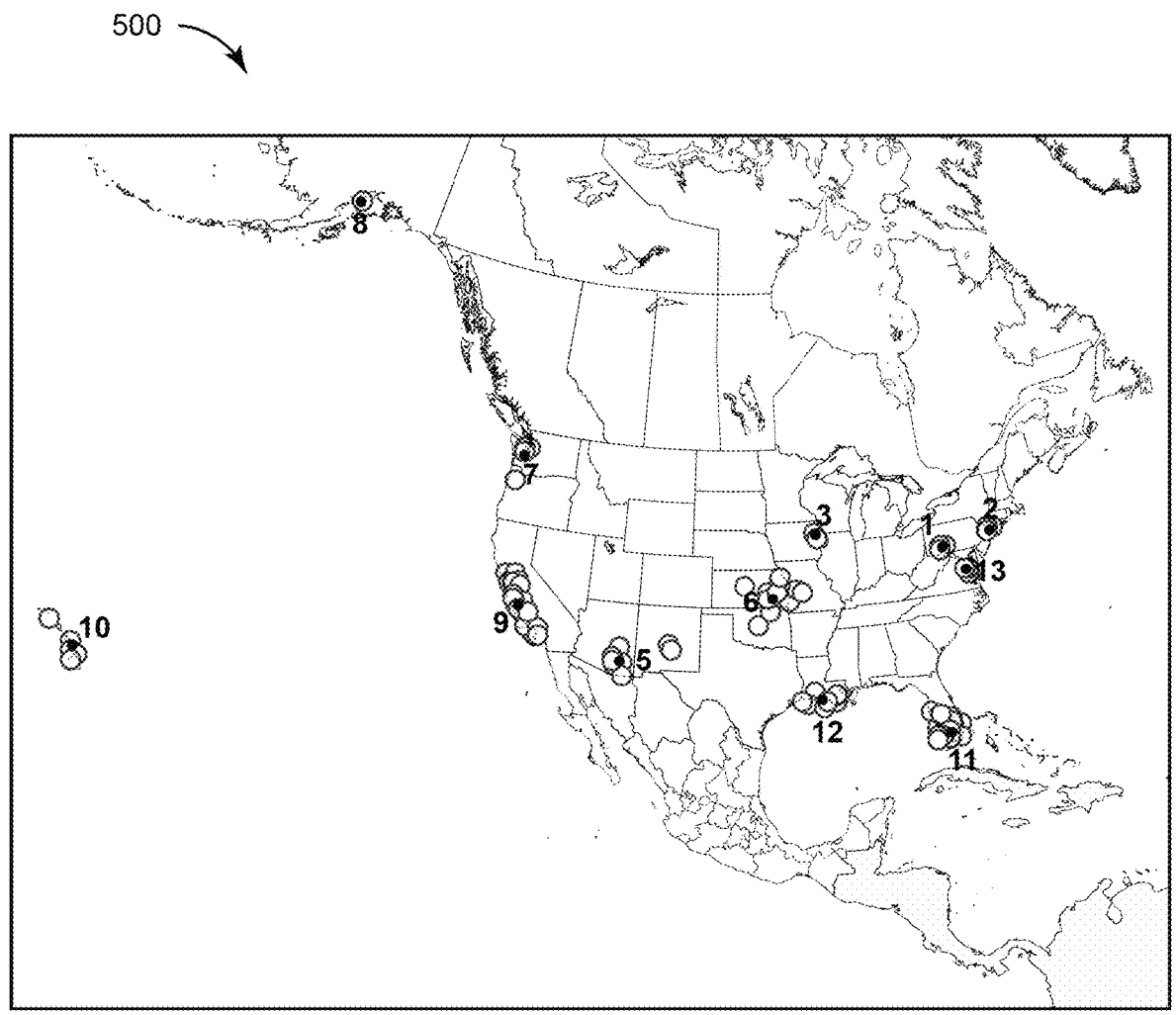
FIG. 5 is a drawing of building sites grouped into clusters performed by the security alarm system illustrated in FIG. 2, according to an exemplary embodiment.

Referring now to FIG. 5, a chart 500 including multiple sites and site clusters, according to an exemplary embodiment. In some embodiments, the chart 500 can be provided as a user interface by the site grouping manager 210 for the user device 218. The site clusters of the chart 500 can be generated by the site grouping manager 210. FIG. 5 provides an example of the site grouping manager 210 applying a clustering algorithm to real geographical data. The data set shown in the chart 500 includes 279 unique sites. Using a clustering algorithm, the site grouping manager 210 can be configured to generate a particular number of clusters, in the example of chart 500, 13 regions. In the example of FIG. 5, noise points were not useful so the minimum points parameter was set to 1. The clusters of FIG. 5 can be utilized to provide site and cluster level metrics to an end user. An example of such metrics are summarizing testing data that was gathered on system as shown in FIG. 6.

Referring now to FIG. 6, a table 600 of the sites of chart 500 of FIG. 5 are shown indicating testing metric performance. The site grouping manager 210 can generate a consistency metric for each site, the metric indicating how consistently each site performs system tests. Clusters 6 and 13 are the most consistent and cluster 3 never performed any tests. Clusters 4 and 9 have the most inconsistent behavior. This technique helps in the regional analysis of results and helps create a logical, data-driven, geographically led, summary of data. In this example, instead of viewing the test results from 279 locations, the user can now view the regional information giving a high-level summary.

Alarm Lists

Referring again to FIG. 2, the alarm list manager 208 can be configured to receive security event data from the security systems 220 and generate interfaces to present alarms based on the received security event data to a user, e.g., via the user device 218. Examples of the interfaces are provided in FIGS. 7-29. The interfaces of FIGS. 7-29 generated by the alarm list manager 208 can include lists of alarms ordered based on parameters. The parameters can be selected such that the alarms are properly filtered and the most important alarms for a user to review and act upon are at the top of the list. In this regard, the alarm list manager 208 can be configured to generate graphical user interface for security monitoring systems that presents an alarm list that clearly displays essential, real-time information and provides interactive operation for the more efficient handling of alarms. The interfaces of FIGS. 7-29 are list-based graphical user interfaces that allow a system operator to view and manage a list of alarms, presenting the most important and current information in a clear and concise format, and providing interactive, intuitive operation for more efficient alarm handling.

Figure 7:
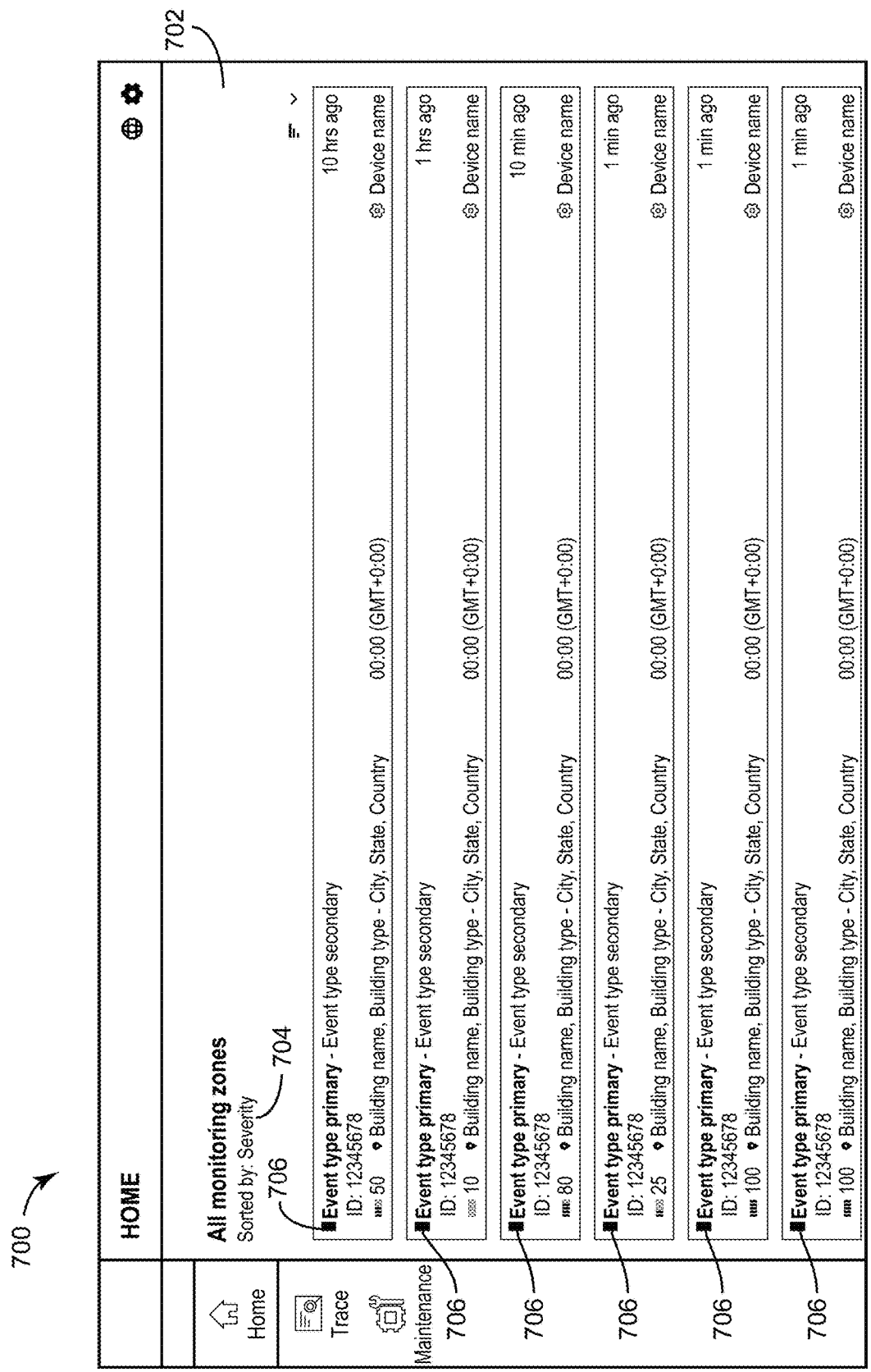
FIG. 7 is an interface including a list of security events that can be managed by the security alarm system illustrated in FIG. 2, according to an exemplary embodiment.
Figure 8:
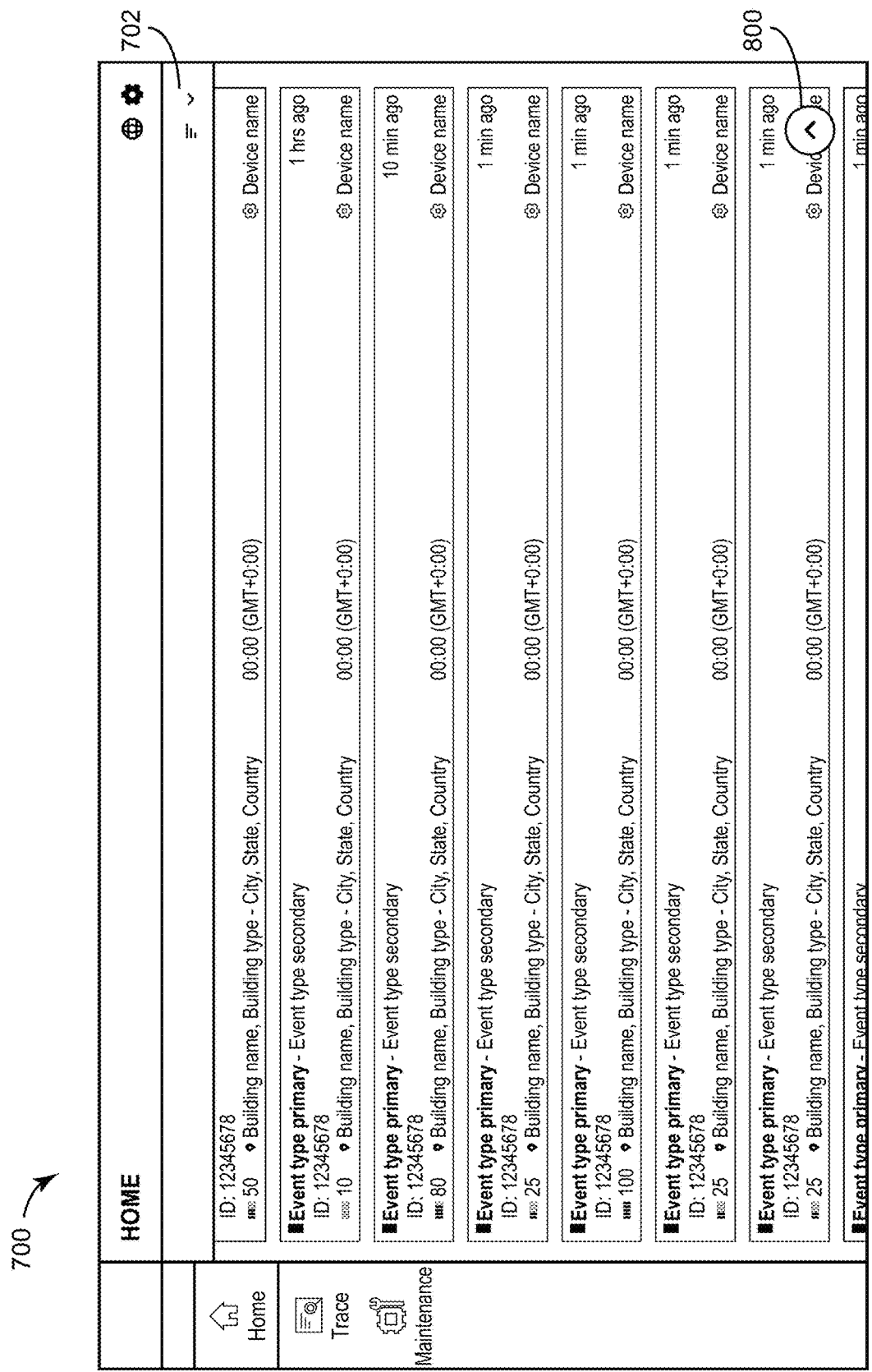
FIG. 8 is the interface illustrated in FIG. 7 scrolling through the security events, according to an exemplary embodiment.
Figure 9:
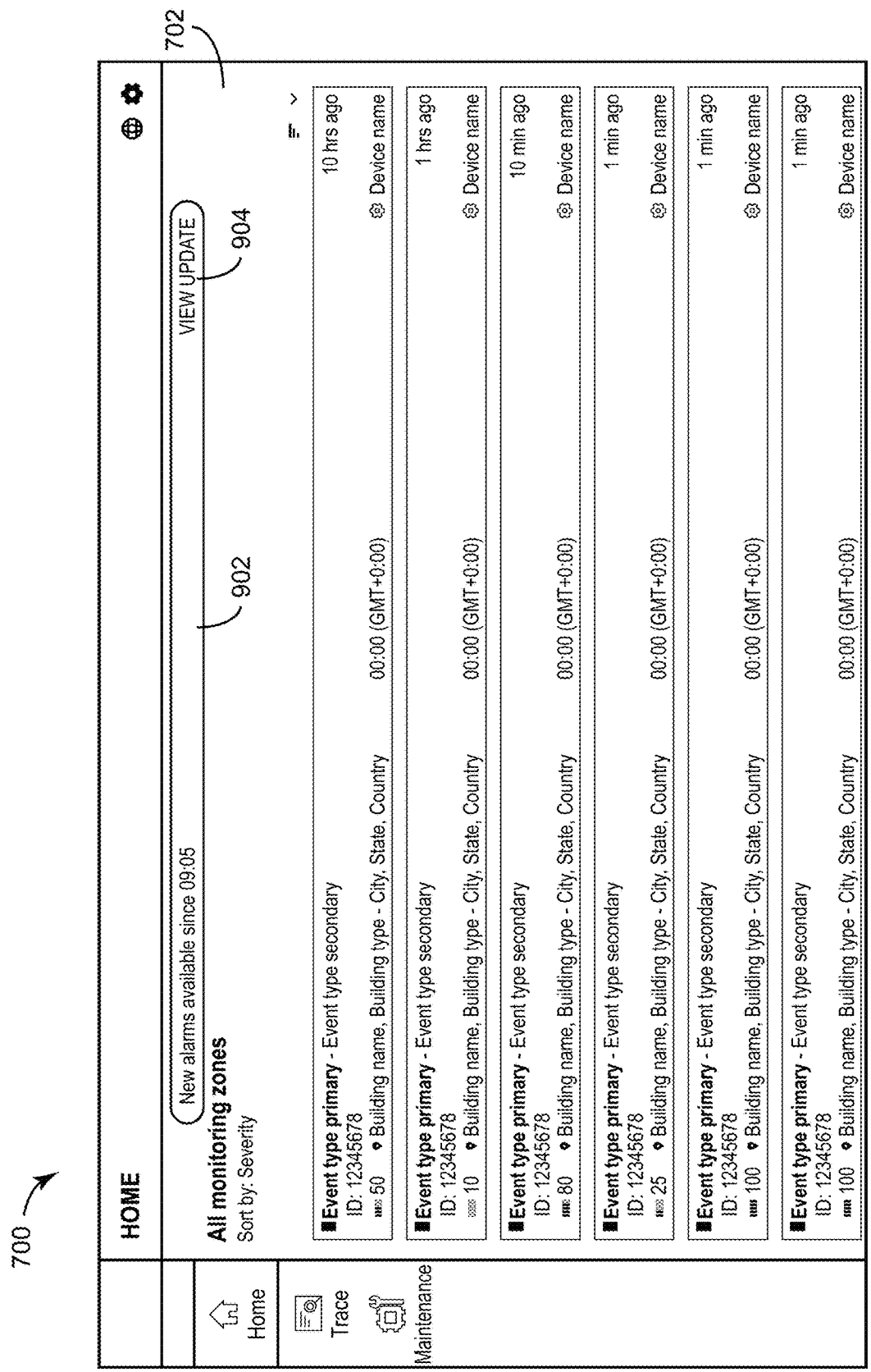
FIG. 9 is the interface illustrated in FIG. 7 including a notification of new events, according to an exemplary embodiment.

Referring now to FIGS. 7-9, an interface 700 including a list of alarms is shown that can be generated and/or managed by the alarm list manager 208, according to an exemplary embodiment. FIGS. 7-9 illustrate a user scrolling through the list of the interface 700 and further indicates the alarm list updating over time with new alarms. FIG. 7 illustrates how the alarm list is presented on a monitoring home page. Alarms, displayed as cards 706, can be automatically sorted (in this example, by a severity parameter 704) and can be presented in order of descending priority. Where alarms have the same priority, the oldest alarm can be positioned higher on the list than the more recent alarms. The alarms and/or scores for the alarms can be color coded, yellow, orange, red, dark red, black, etc. to indicate increasing priority.

FIG. 8 shows how the display can operate when the user scrolls to the visible end of the list of the interface 700. The alarm list can load the next set of alarms on the list. A list control banner 702 can collapse to a single line to allow more space for the alarm list. As the user scrolls down the list, a pop-up button 800 can appear that allows the user to scroll quickly to the top of the list. If the user interacts with the button 800, the user can be rapidly navigated to the top of the alarm list. FIG. 9 illustrates the interface 700 after the user scrolls to the top of the alarm list. The alarm control banner 702 can expand to its full size and a pop-up alarm update alert 902 can display automatically at the top of the screen. The alert 902 indicates that new alarms have been received by the security alarm system 200 but have not yet been added to the alarm list of the interface 700, in some embodiments. Furthermore, the alert 902 includes an indication of time since the first new alarm was received.

The alarm update alert 902 may remain at the top of the interface 700 even if the user scrolls up or down, i.e., the alert 902 is "stickied" to the top of the interface 700. Furthermore, the alert 902 may be persistent. For example, the alert 902 may remain at the top of the interface 700 until a user interacts with the alert 902. In response to the user interacting with a "View Update" element 904, the alarm list manager 208 can refresh the alarm list and cause the alarm list to display the new alarms sorted with the current alarms. In some embodiments, the refresh causes only the new alarms that have a priority greater than the current alarms and/or a predefined amount to appear in the list. Furthermore, the alert 902 dynamically shows the most current information, which is automatically updated on the alarm list. In some embodiments, the refresh is performed based on user input. In some embodiments, the refresh is performed automatically based on the presence of new alarms that change the information displayed in the interface 700, for example, based on the current sorting parameter of the interface 700, the alarm list manager 208 can determine if the new alarms change the alarm information displayed in the interface and refresh the information in the interface 700 if the new alarms change the information. For example, if the interface 700 is sorted based on severity, the alarm list manager 208 can be configured to compare the severity of the new alarm to the alarms of the interface 700 and refresh the interface 700 to include the new alarm if the new alarm has a severity that is higher than the severities of the alarms in the interface 700. Similar automatic interface refreshing processes can be performed by the alarm list manager 208 for different sorting parameters.

Figure 10:
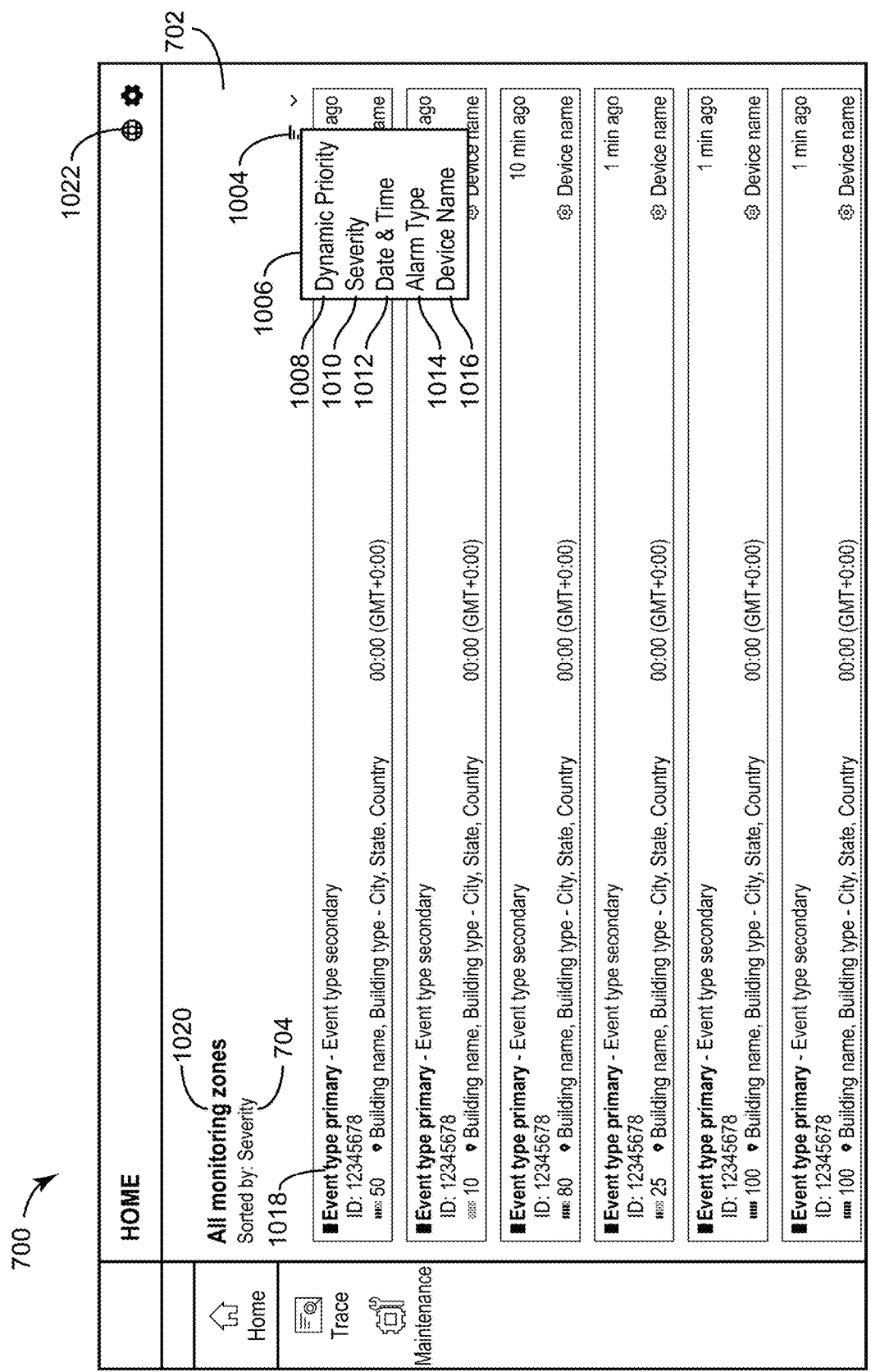
FIG. 10 is the interface illustrated in FIG. 7 including a filter element for filtering the security events, according to an exemplary embodiment.
Figure 11:
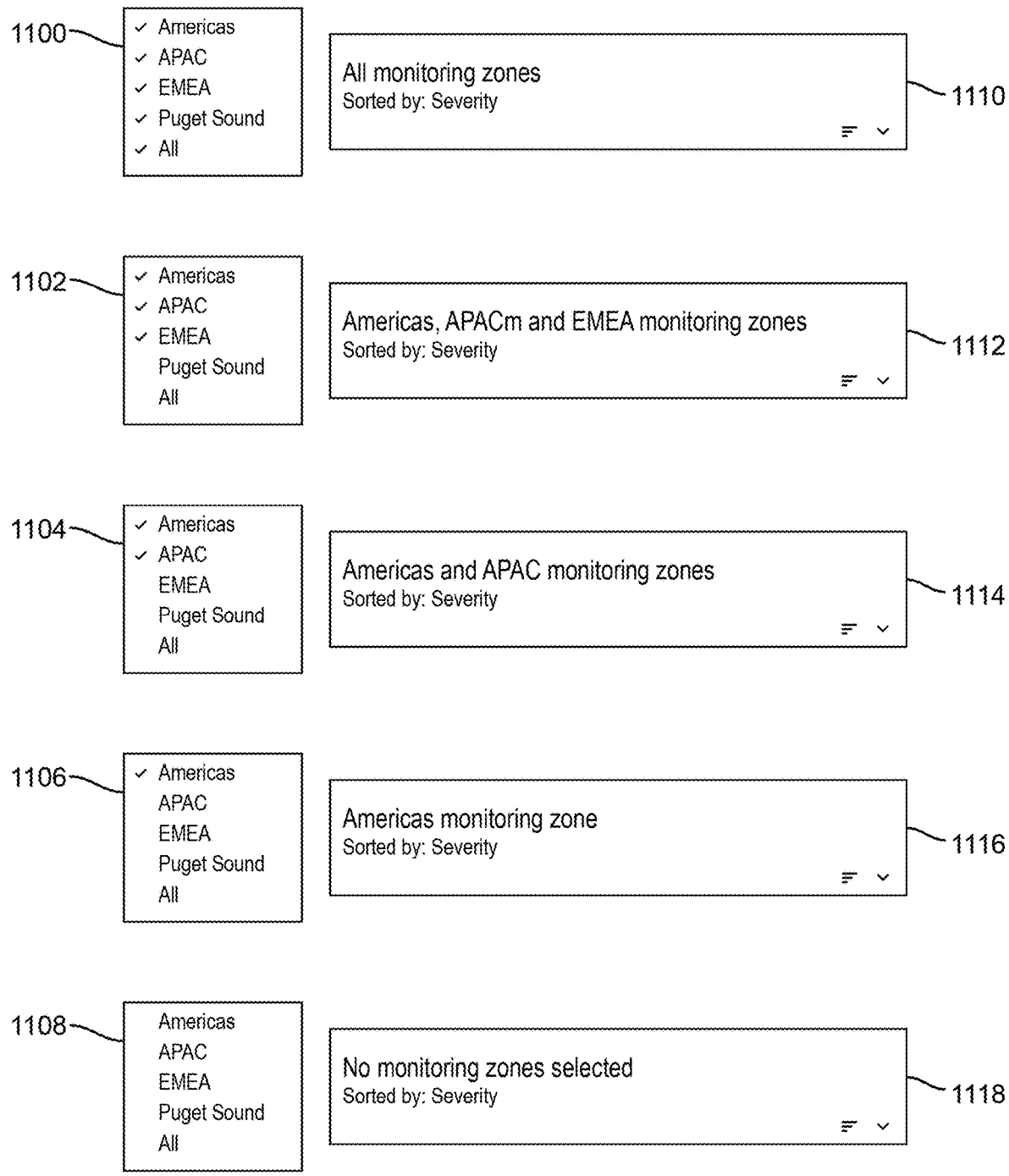
FIG. 11 are interface elements for sorting the security events of the interface illustrated in FIG. 7 based on site regions, according to an exemplary embodiment.
Figure 12:
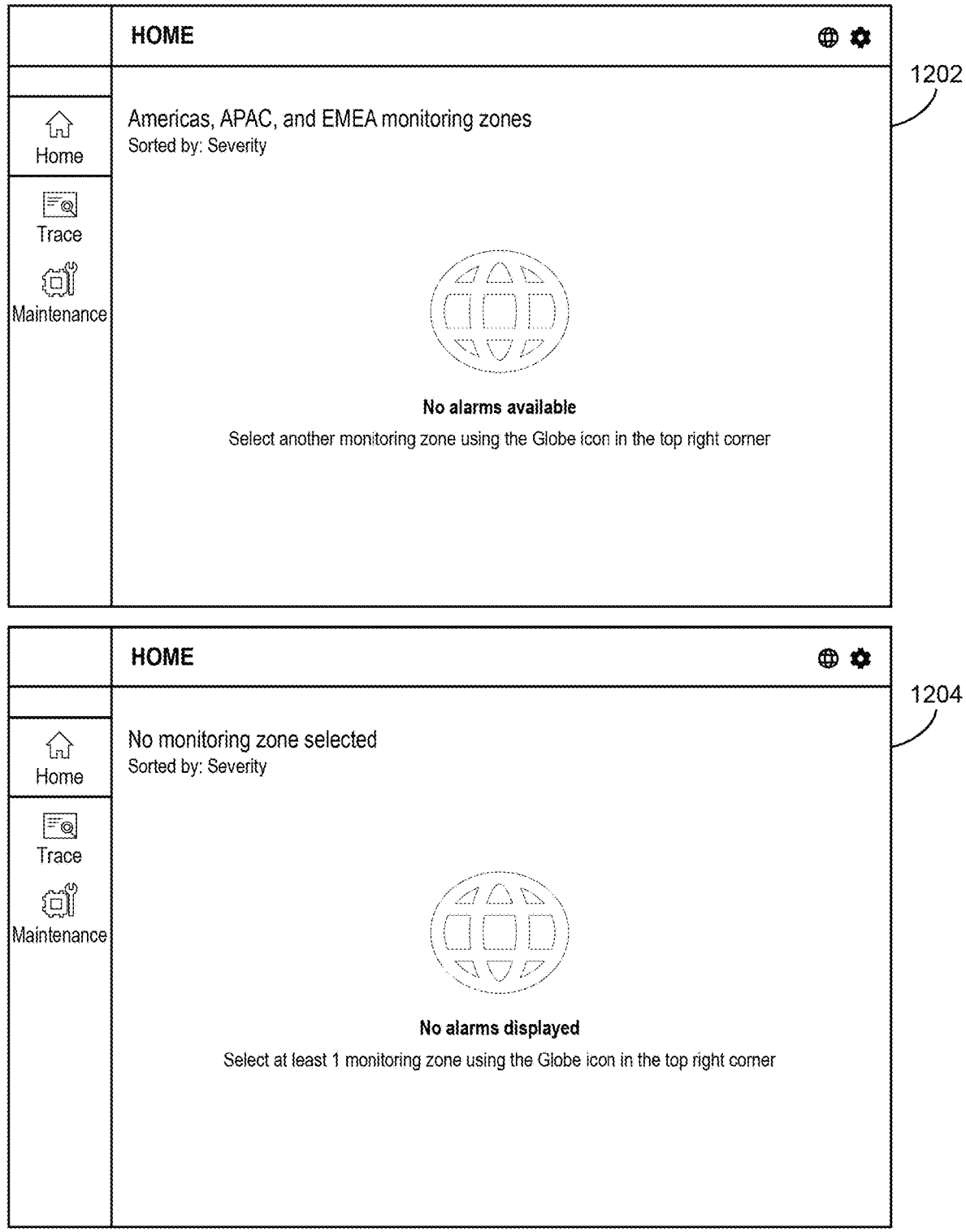
FIG. 12 are interfaces for event lists of the site regions illustrated in FIG. 11, according to an exemplary embodiment.

Referring now to FIGS. 10-12, the interface 700 is shown with sorting and filtering the alarm list based on filtering parameters and monitoring zones, according to various exemplary embodiments. FIG. 10 illustrates the monitoring home page 700 with an alarm list. The alarm list sorting label 704 indicates that alarms are currently sorted in order of descending severity (in this example, severity is the default sorting criterion). A menu icon 1004 on the control banner 702 may be selected by the user. When the user selects this menu, a pop-up window 1006 appears, with a list of different alarm sorting criteria. In this example, the criteria shown are dynamic priority 1008, severity 1010, date & time option 1012, alarm type 1014, and device name 1016. The interface 700 can be configured with any set of other sorting criteria. When the user selects from the sorting criteria list, the alarm list can be sorted in accordance with the selected criterion. When the user reloads the page, the alarm list resets to the default sorting criterion, which can be configured according to the requirements of the system.

The dynamic priority 1008 option causes the alarm list manager 208 to place highest priority alarms on top. For items with equal priority, the alarm list manager 208 is configured to sort by date and time, e.g., with oldest alarms on top. In some embodiments, the dynamic priority 1008 is a combination of severity and a risk score for a particular asset (e.g., which defines a level of risk for a particular asset is based on an alarm). The severity 1010 option causes the alarm list manager 208 to sort the highest severity alarms on top. For items with equal severity, the alarm list manager 208 is configured to sort by date and time, with oldest alarms on top, in some embodiments. The date & time option 1012 cause the alarm list manager 208 to sort the alarms for items with equal dynamic priority or severity, oldest alarms on top, in some embodiments. The alarm type 1014 option can be the primary event type classification of the alarm causing the alarm list manager 208 to sort by alarm type, e.g., as indicated by marker element 1018, in some embodiments. The alarm type 1014 option causes the alarm list manager 208 to sort alarms alphabetically from A to Z and then by date and time, in some embodiments. The device name 1016 option causes the alarm list manager 208 to sort by device name alphabetically from A to Z and numerically from zero up, in some embodiments. Where a monitoring system is divided into zones, the default list display 1020 can show alarms for all monitoring zones. By selecting the globe icon on the page header 1022, the user may filter the alarm list display by zone.

In FIG. 11, various views 1100-1108 of the list menu that displays as a modal window when the user selects the globe icon 1122 to filter the alarm list by monitoring zone are shown, according to an exemplary embodiment. By default, all zones are selected in view 1100. This option is persistent when reloading the monitoring home page. Selecting or deselecting a filtering option updates the alarm list view. Multiple filtering options shown in views 1102 and 1104, a single option in view 1106, or no option shown in view 1108 may also be selected. If the user selects outside the modal window, it will close. The monitoring home page control banner changes according to the zone filtering options selected. See the examples at 1110, 1112, 1114, 1116, and 1118.

In FIG. 12, two example interfaces 1202 and 1204 illustrate two examples of the monitoring home page, when there are no open alarms, according to an exemplary embodiment. The first display 1202 has been filtered by zone but shows no open alarms for those zones. The second display 1204 has no zones selected and therefore no alarms are displayed.

Figure 13:
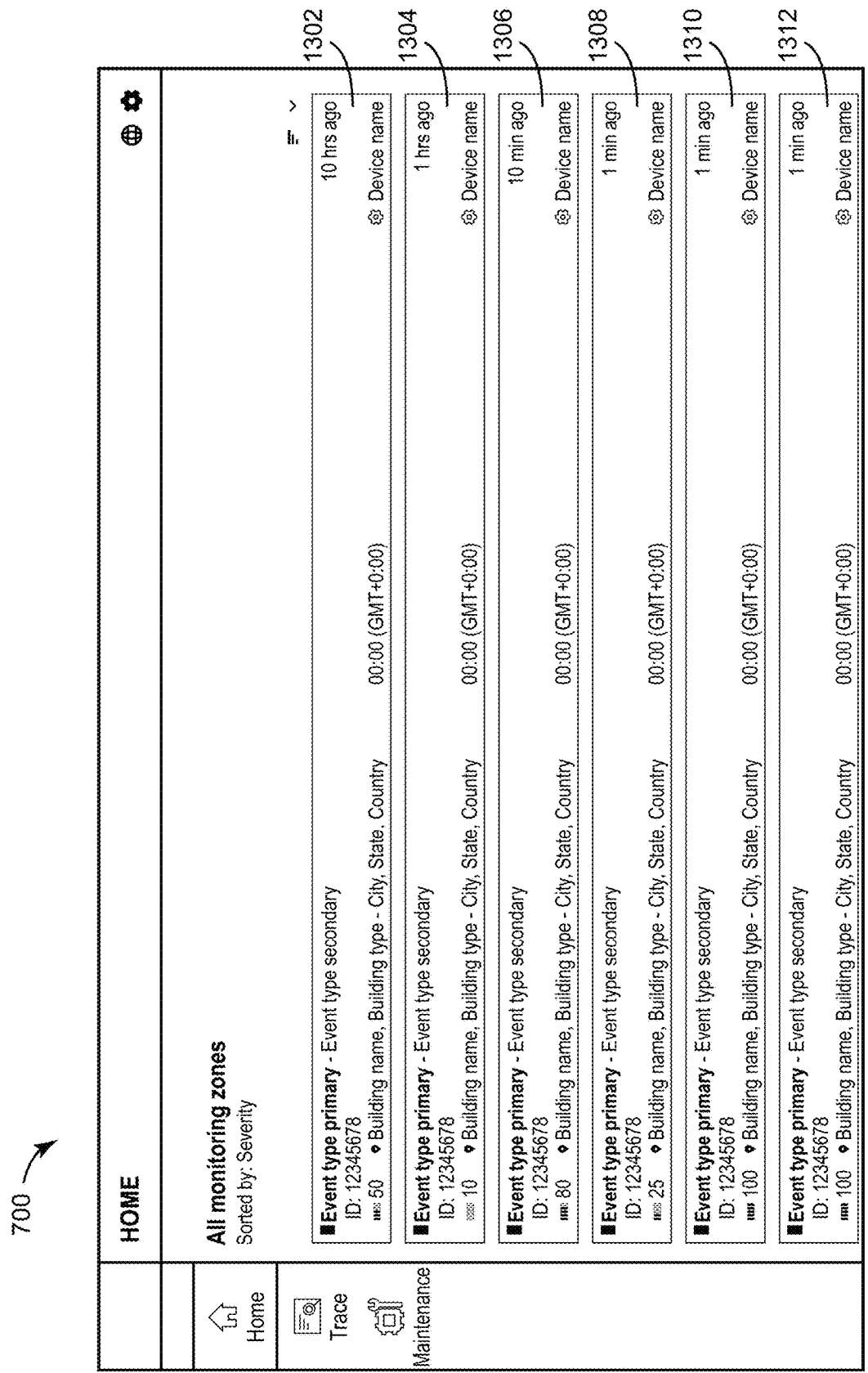
FIG. 13 is the interface illustrated in FIG. 7 including the security events sorted by severity, according to an exemplary embodiment.
Figure 14:
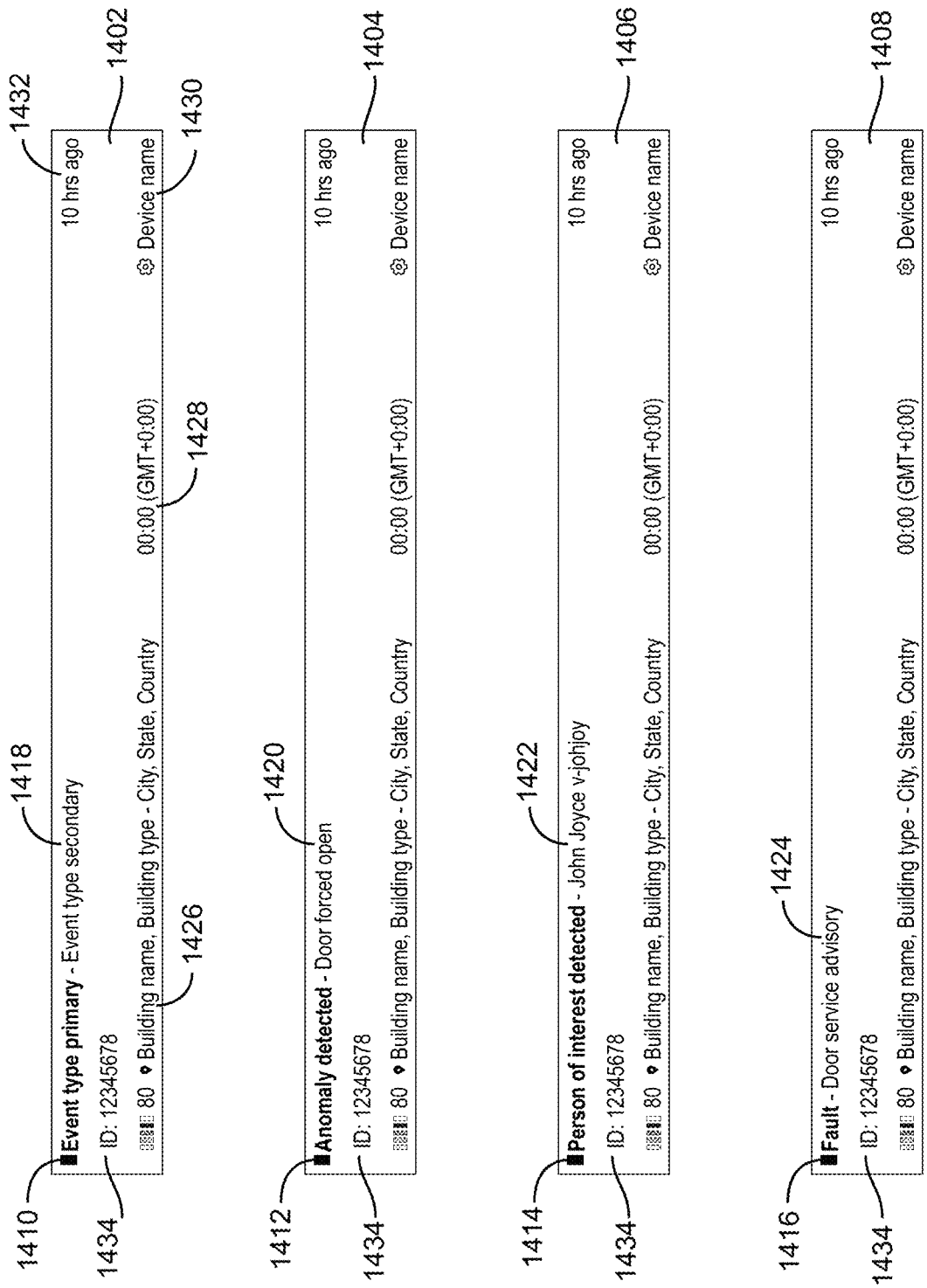
FIG. 14 is a block diagram of the security events illustrated in FIG. 7, according to an exemplary embodiment.

Referring now to FIGS. 13-14, the interface 700 is illustrated in greater detail to include particular features for alarm list elements, according to various exemplary embodiments. FIG. 13 illustrates the monitoring home page. The alarm list elements 1302-1312 represent various alarms and information for each of the alarms. FIG. 14 includes various examples of a listed alarm element, elements 1402, 1404, 1406, and 1408.

The element 1402 includes a primary event type 1410. Examples of primary event types are shown as anomaly detected 1412 in element 1404, person of interest detected 1414 in element 1406, and fault 1416 in element 1408. The text color of the primary event type 1410 changes to indicate severity or any other alarm sorting criterion. A secondary event type 1418 is included in the element 1402. Examples of secondary event types are shown as door forced open 1420 in element 1402, name of person of interest 1422 in element 1406, and door service advisory 1424 in element 1408.

The risk score of the building affected by a particular alarm is shown as a color-scale icon together with a numerical value that can automatically update at an time interval (e.g., every minute) to help the user quickly identify the severity of the risk score. A building indication 1426 is shown in the elements 1402-1408 an includes an indication of building name, type, building location, and the country that the building is located in. Indication 1428 includes a time of the event in local time and the relevant time zone. The name of the device 1430 generating the alarm is further shown in the elements 1402-1408. Indication 1432 includes an amount of time elapsed since the alarm was generated, which automatically updates at set intervals. Finally, the elements 1402-1408 include an alarm identifier (ID) 1434 which can uniquely identify each alarm.

Figure 15:
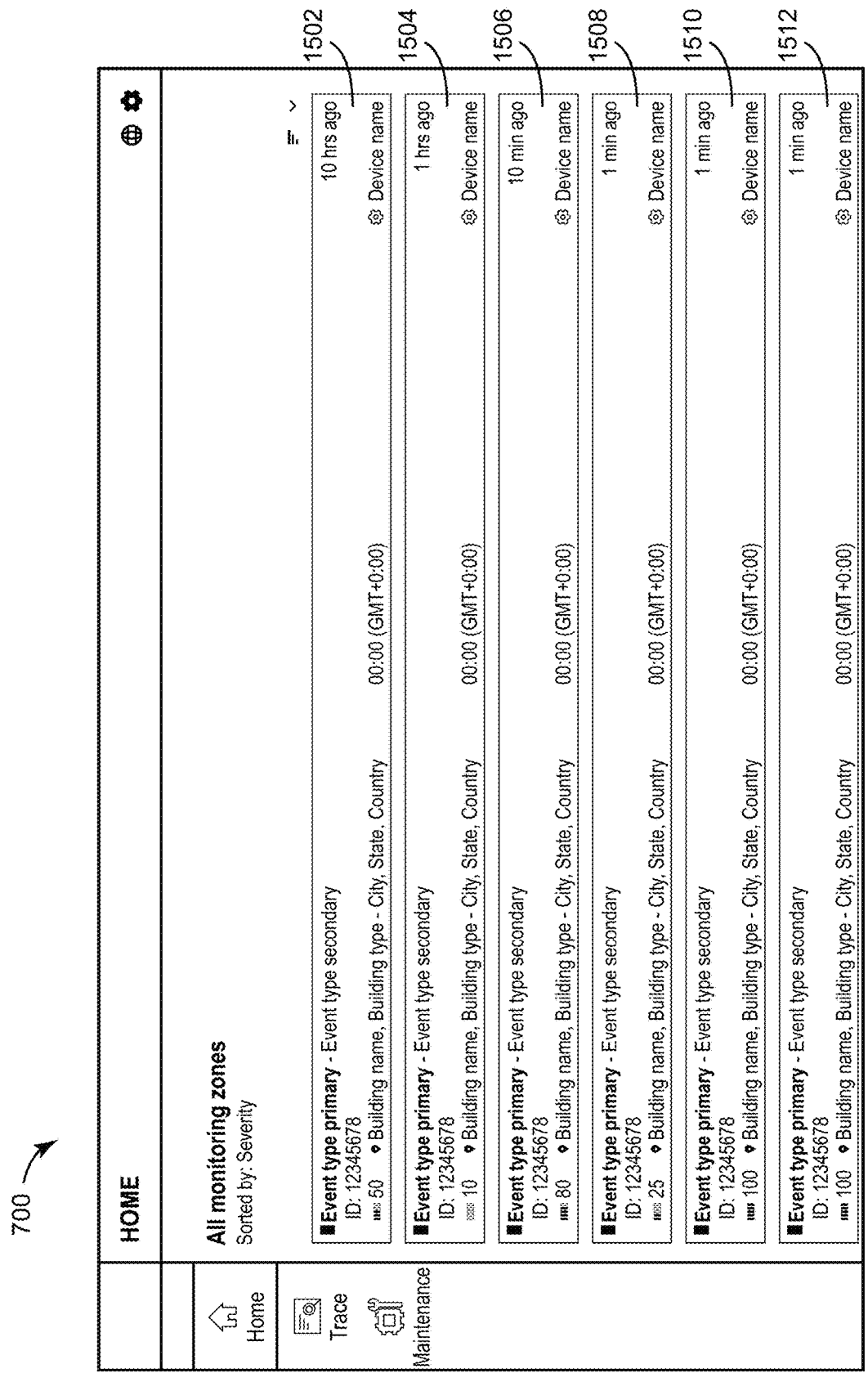
FIG. 15 is the interface illustrated in FIG. 7 illustrating accepting and closing alarms, according to an exemplary embodiment.
Figure 16:
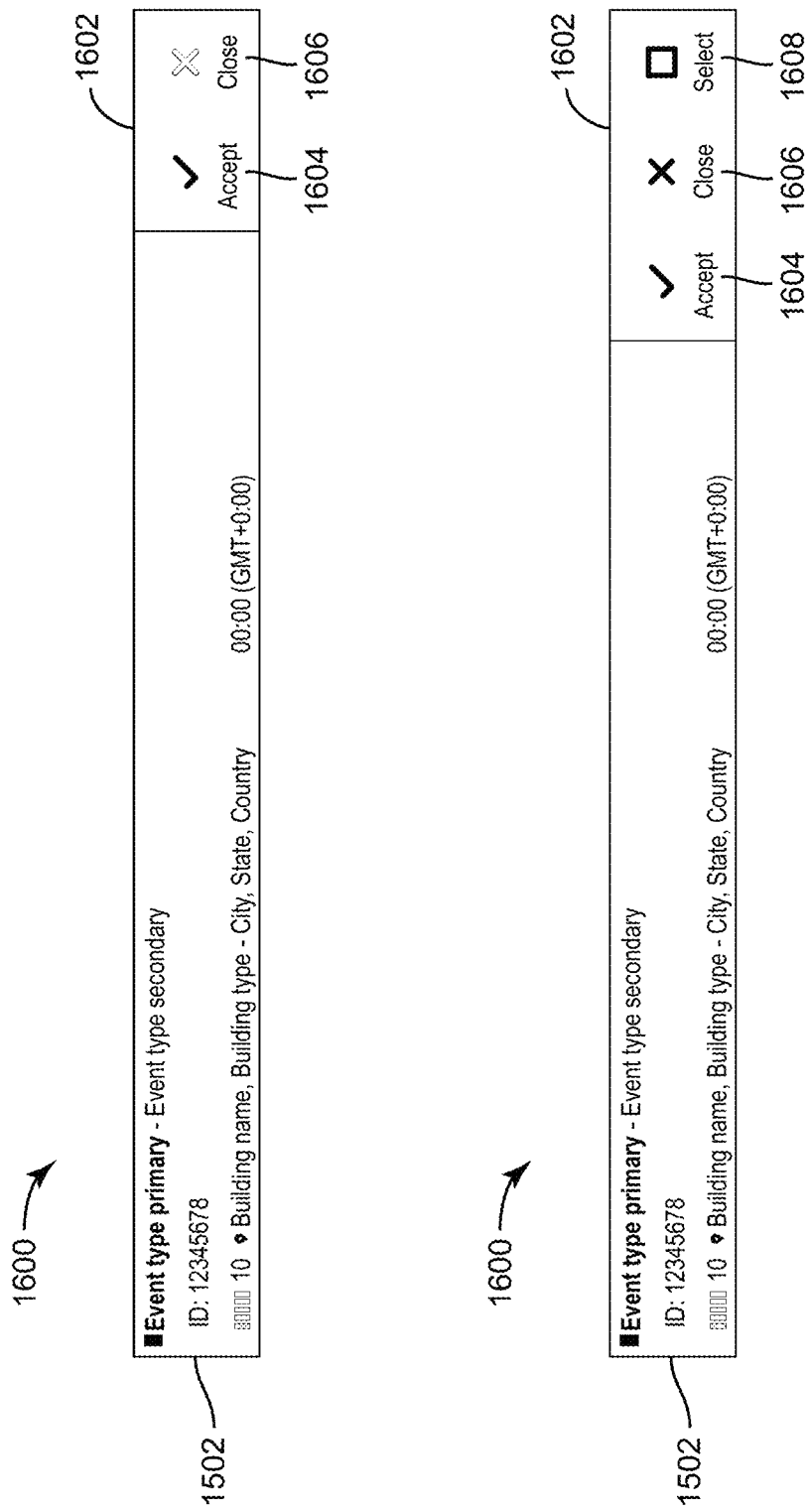
FIG. 16 is an interface of the security events illustrated in FIG. 7 illustrating alarms of the interface illustrated in FIG. 15 that can be accepted and closed, according to an exemplary embodiment.

Referring now to FIGS. 15-17, the interface 700 is shown with alarms 1502-1512 that can be accepted by a user, according to various exemplary embodiments. A user can accept an alarm indicating that the particular user is handling the alarm and preventing multiple users from handling the same alarm. FIG. 15 includes the home screen interface 700 including alarms 1502-1512. When the user hovers their cursor over an alarm list element, e.g., the alarms 1502-1512, the relevant alarm list element can reveal actions for the alarm, which can depend on that permissions of the user and on whether the alarm has been accepted by another user.

FIG. 16 includes two detailed views 1600 and 1610 of the options appearing within the alarm 1502 when the user hovers their cursor over the alarm 1502. The alarm 1502 in view 1600 includes options available to a user with regular user privileges, for example a security operator. Alarm 1502 shows the options available to a user with superior privileges, for example, a security advisor in view 1610.

The options 1602 displayed to the user with regular privileges are accept 1604 (available) and close 1606 (not available) in the view 1600. The user cannot close this alarm because the user has not accepted it and it has not been accepted by any other system user. The user can be required to first accept an alarm via accept 1604 in the view 1600 before being able to close the alarm via close 1606. In the view 1610, the options 1602 displayed and available to the user with superior privileges are accept 1604, close 1606, and select 1608. As shown in view 1610, all of the options 1604-1608 are available to the user since the user has a high access level. This user can automatically close, via the option 1606, an alarm without being required to first accept the alarm via the option 1604.

FIG. 17 illustrates the alarm list changing when a user selects the accept option 1606 for an alarm list element. If the selection by the user is successful, a transient, self-dismissing message 1704, can be displayed, confirming acceptance and providing the alarm identifier (ID). The alarm list element 1702 updates to show that the alarm has been accepted by a user an is being handled by that user, in some embodiments. The element 1702 includes an indication of the name of the user that has accepted the alarm. Where the selection by a user is unsuccessful due to an error, a window 1706 can appear, confirming the error and giving options "OK" and "TRY AGAIN." The window 1706 can be displayed when there is a technical error accepting an alarm, e.g., a database error, a network error, etc. Accepting an alarm may also be unsuccessful when another user has already accepted the alarm. When a user acceptance of an alarm is unsuccessful because the alarm has since been accepted by another user, a window 1708 appears, confirming that the alarm has been accepted by another user, giving their name, and giving options to "CANCEL" (disabled, as the alarm is in progress by another user) or "VIEW ALARM."

Figure 18:
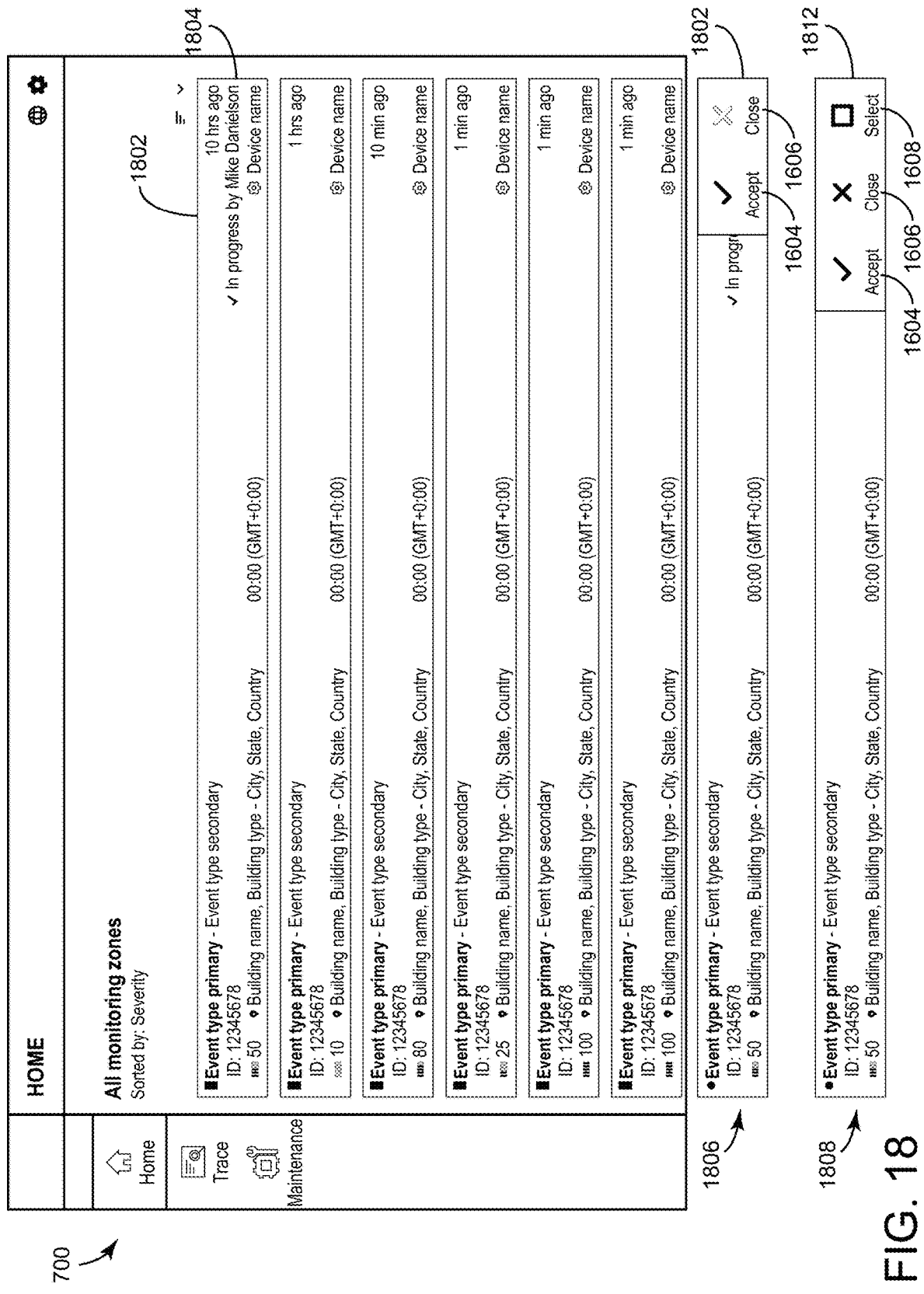
FIG. 18 is the interface illustrated in FIG. 7 illustrating a security event being successfully accepted, according to an exemplary embodiment.

Referring now to FIG. 18, the interface 700 is shown when an alarm is accepted by someone other than a current user, according to an exemplary embodiment. FIG. 17 shows the alarm list display 1802 where one alarm list element has been accepted by a user. When hovering their cursor over the list element, a user with regular user privileges, for example a security operator, sees the options "Accept" and "Close," options 1604 and 1606 both of which are unavailable to the current user. In view 1806, the current user cannot accept or close the alarm, because it is in progress by another user, "Mike Danielson" as indicated by indicator 1804.

When hovering their cursor over the list element, a user with superior privileges, for example, a security advisor, sees "Accept," "Close," and "Select," options 1604-1608 all of which are unavailable to the current user in view 1808. Again, this is because the alarm is in progress by another user.

Figure 19:
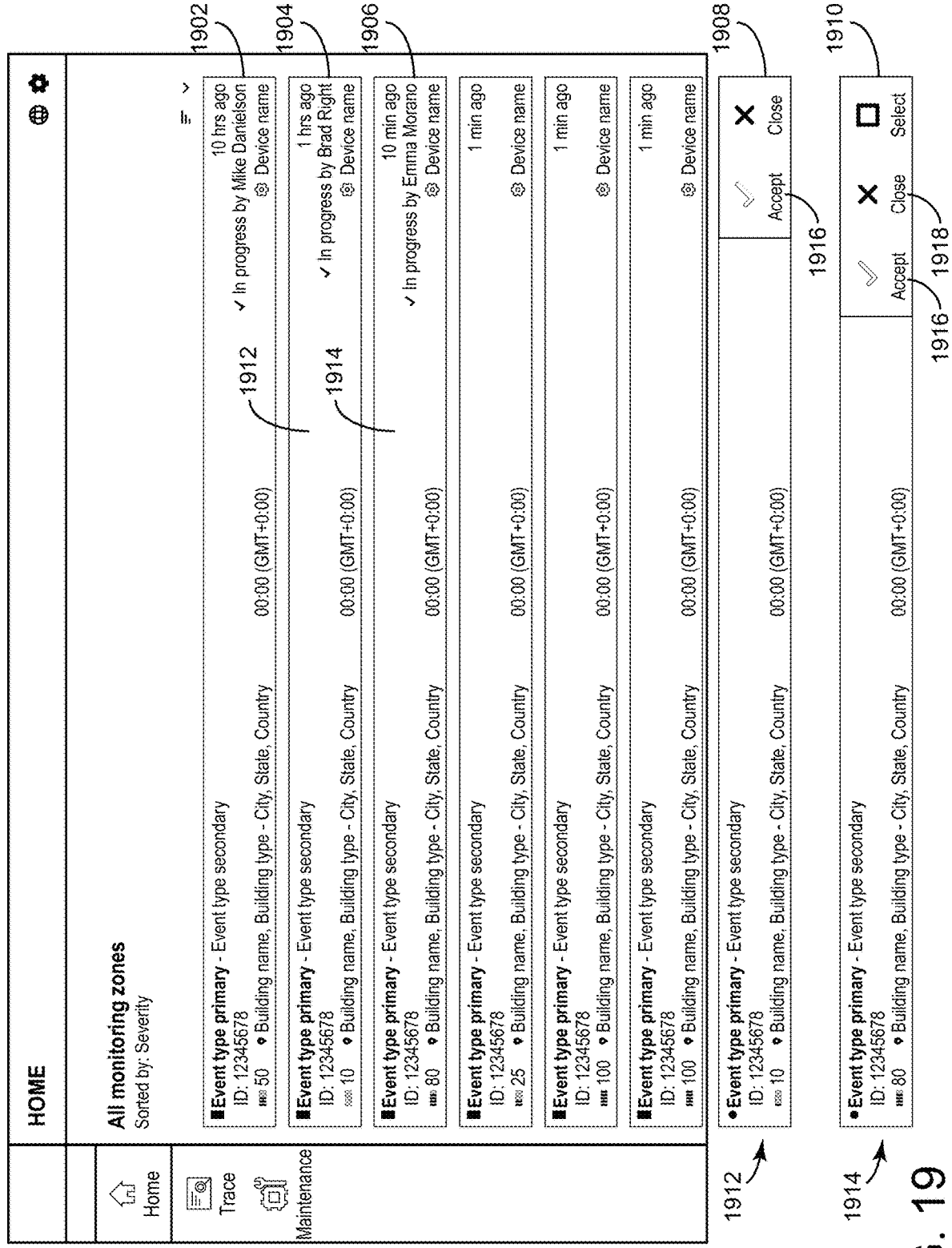
FIG. 19 is the interface illustrated in FIG. 7 illustrating an accepted security event being closed, according to an exemplary embodiment.
Figure 21:
FIG. 21 is the interface illustrated in FIG. 7 including an indication of a successfully closed security event, according to an exemplary embodiment.

Referring now to FIGS. 19-21, the interface 700 is shown when a user closes an alarm from the alarm list of the interface 700, according to various exemplary embodiments. FIG. 19 illustrates the alarm list view where several alarms are in progress by different users indicated by elements 1902-1906. The list element can display a green checkmark to a user who has accepted the alarm referred to in that list (e.g., element 1904). The checkmarks appear grey to a user in respect of alarms that are in progress by another user (e.g., the elements 1902 and 1906).

Upon hovering their cursor over an alarm list element 1912, a regular user who has accepted alarm 1912, sees the "Accept" and "Close" options 1916 and 1908. The action "Accept" is disabled and the action "Close" is active for this user. Upon hovering their cursor over an alarm list element 1914, a user with superior privileges who has accepted that alarm 1906, "Accept" (disabled), "Close" (enabled), and "Select" (enabled) options 2216.

FIG. 20 includes details of a window 2002 that appears when a regular user selects a "Close" option on an alarm list element as described with reference to FIG. 19. The window 2002 provides a drop-down list of disposition codes, which can be mandatory (as indicated by window 2002), and an additional, optional, field 2004 to input a comment. The drop-down list 2006 of disposition codes provides various classification labels to close the alarm. Once a disposition code is selected, the drop-down list 2006 can disappear and the selection can be displayed in the window 2002. The user, in this example, can select "Dispatch-Confirmed source" from the list and can select the "OK" element to confirm.

FIG. 21 shows the interface 700 including the alarm list following the action to close the alarm. The closed alarm list item has been removed from the list and a transient, self-dismissing message 2102 can appear within the interface 700 confirming that the user has closed the alarm and giving the alarm ID.

Referring now to FIGS. 22-29, the interface 700 is shown where a user performs bulk actions on alarm list elements of the alarm list of the interface 700, according to various exemplary embodiments. FIG. 22 again shows the interface 700, an example of the monitoring home page with the alarm list. Bulk actions are only available to users with superior privileges, such as a security monitor. This example looks at bulk actions on alarm list items from the perspective of a security monitor user. The security monitor hovers their cursor over an alarm list item 2202 of the interface 700.

Figure 23:
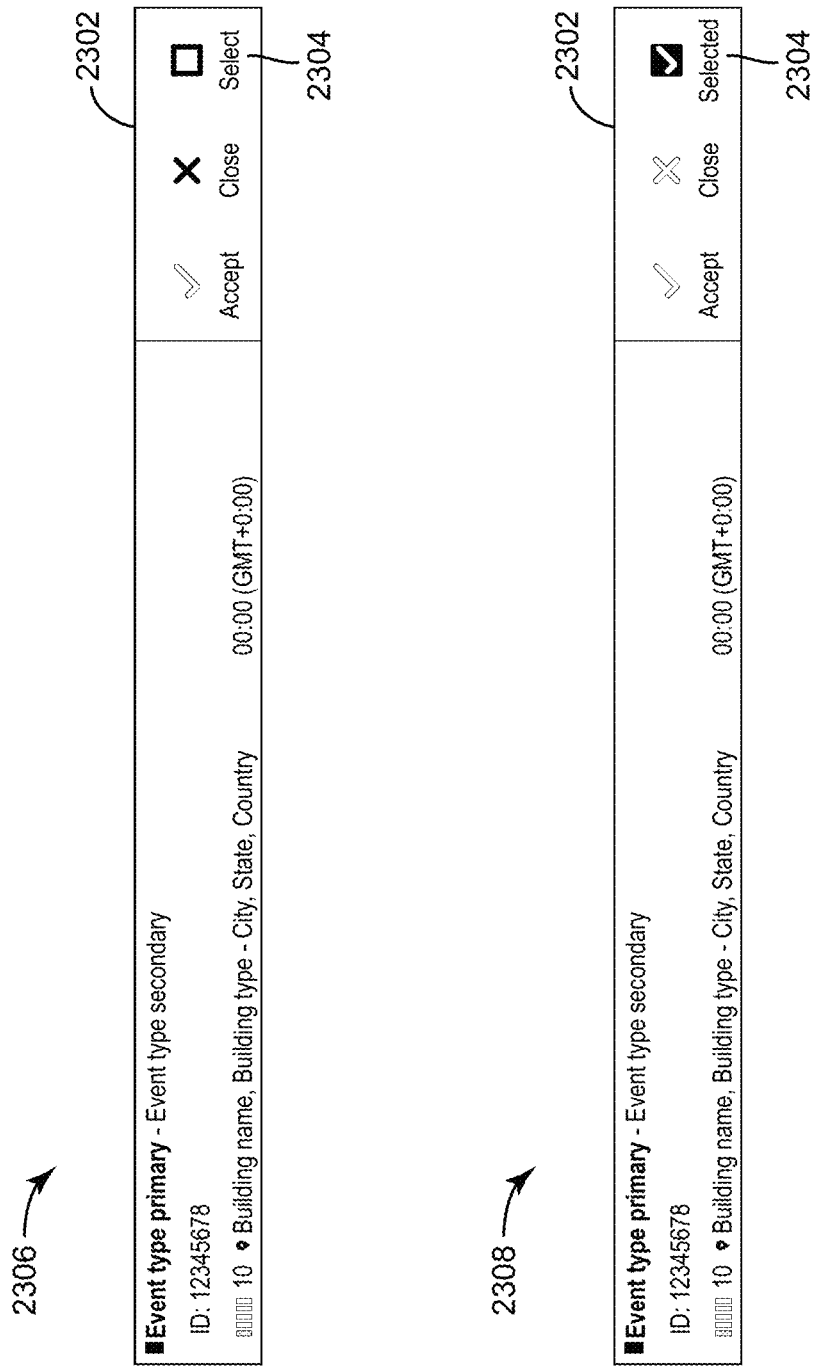
FIG. 23 is a drawing of interface elements for selecting one or multiple of the security events illustrated in FIG. 7, according to an exemplary embodiment.
Figure 24:
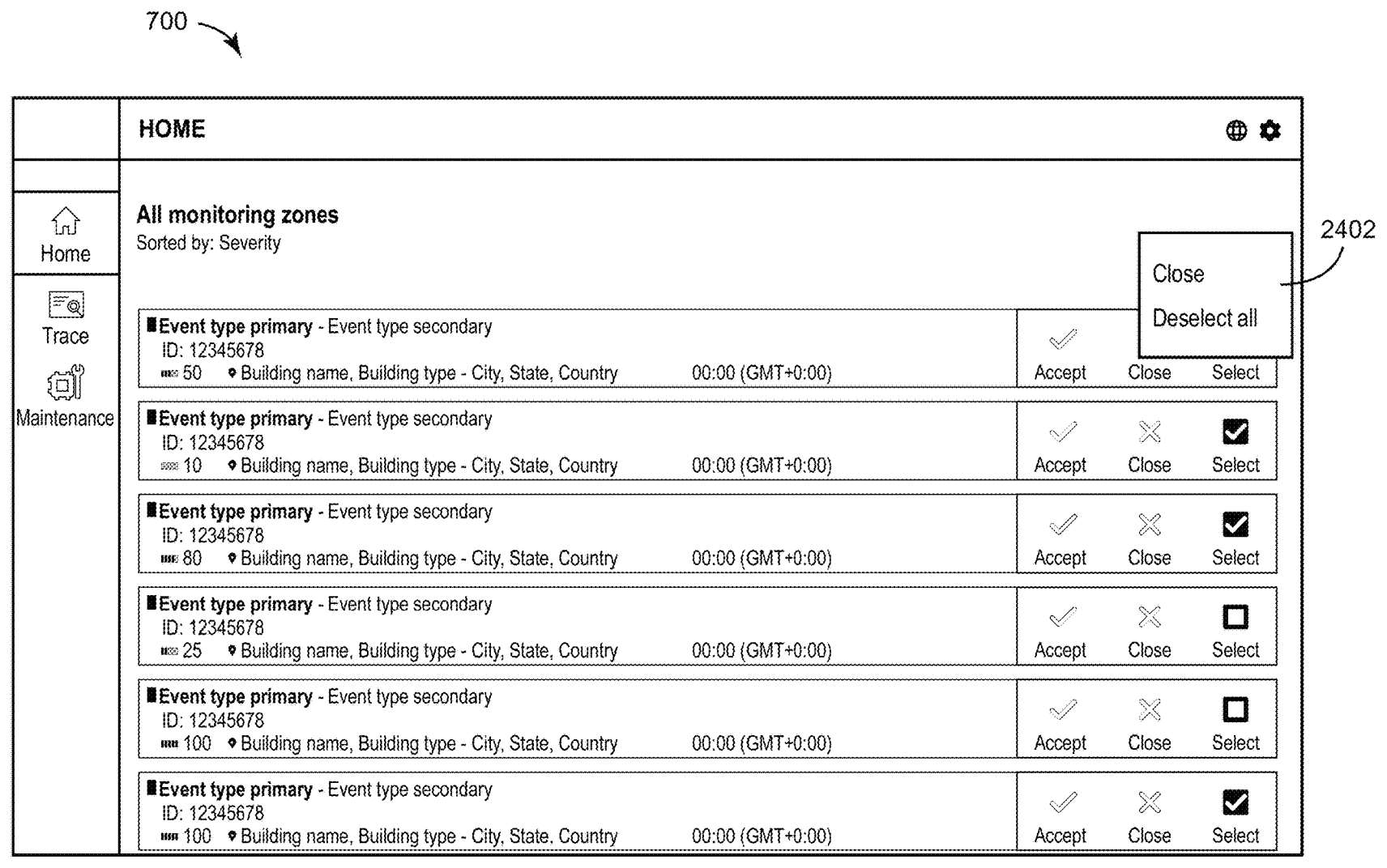

FIG. 23 shows the alarm list element in detail and the options available to the user. The available options are "Close" or "Select," with the "Accept" option being disabled because, in this instance, the user has already accepted this alarm. In this example, the user selects the alarm 2202. The "Select" option 2304 of the options 2302 allows the user to select multiple alarms from the list and act on them in bulk. FIG. 24 shows the alarm list of the interface 700 where the user has selected multiple alarm list items. A window 2402 can appear, giving the user options to "Close" all the selected alarms or "Deselect all" the selected alarms.

Figure 25:
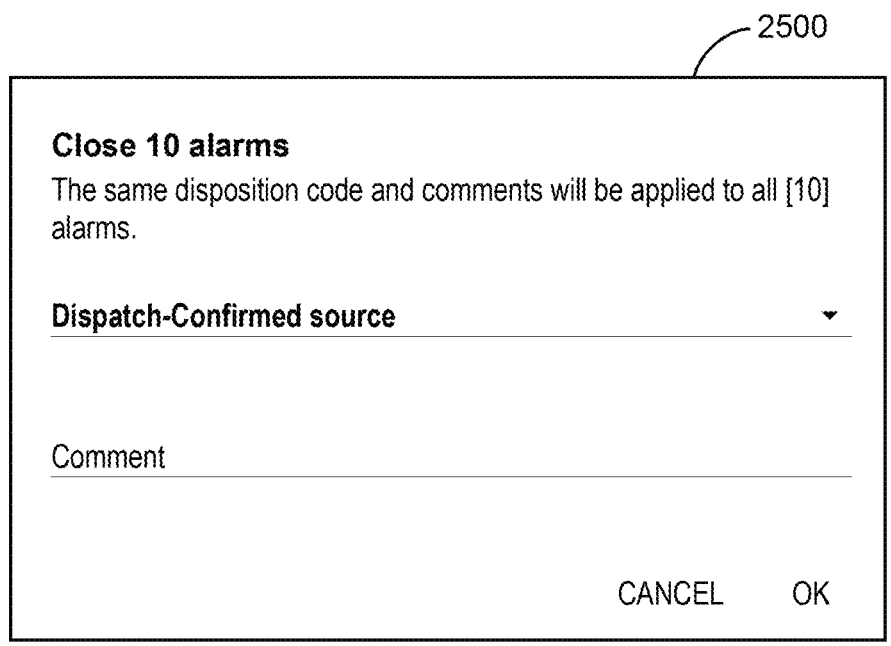
FIG. 25 is an interface element for closing the multiple selected security events illustrated in FIG. 24, according to an exemplary embodiment.

FIG. 25 shows the window 2500 that appears when the user selects the "Close" option of the window 2402 as described with reference to FIG. 24. In this example, 10 alarms were selected. The window 2500 can require a selection of a disposition code for all 10 alarms from a drop-down menu. The window 2500 can also provide a field for an optional comment that can be applied to all 10 alarms.

Figure 26:
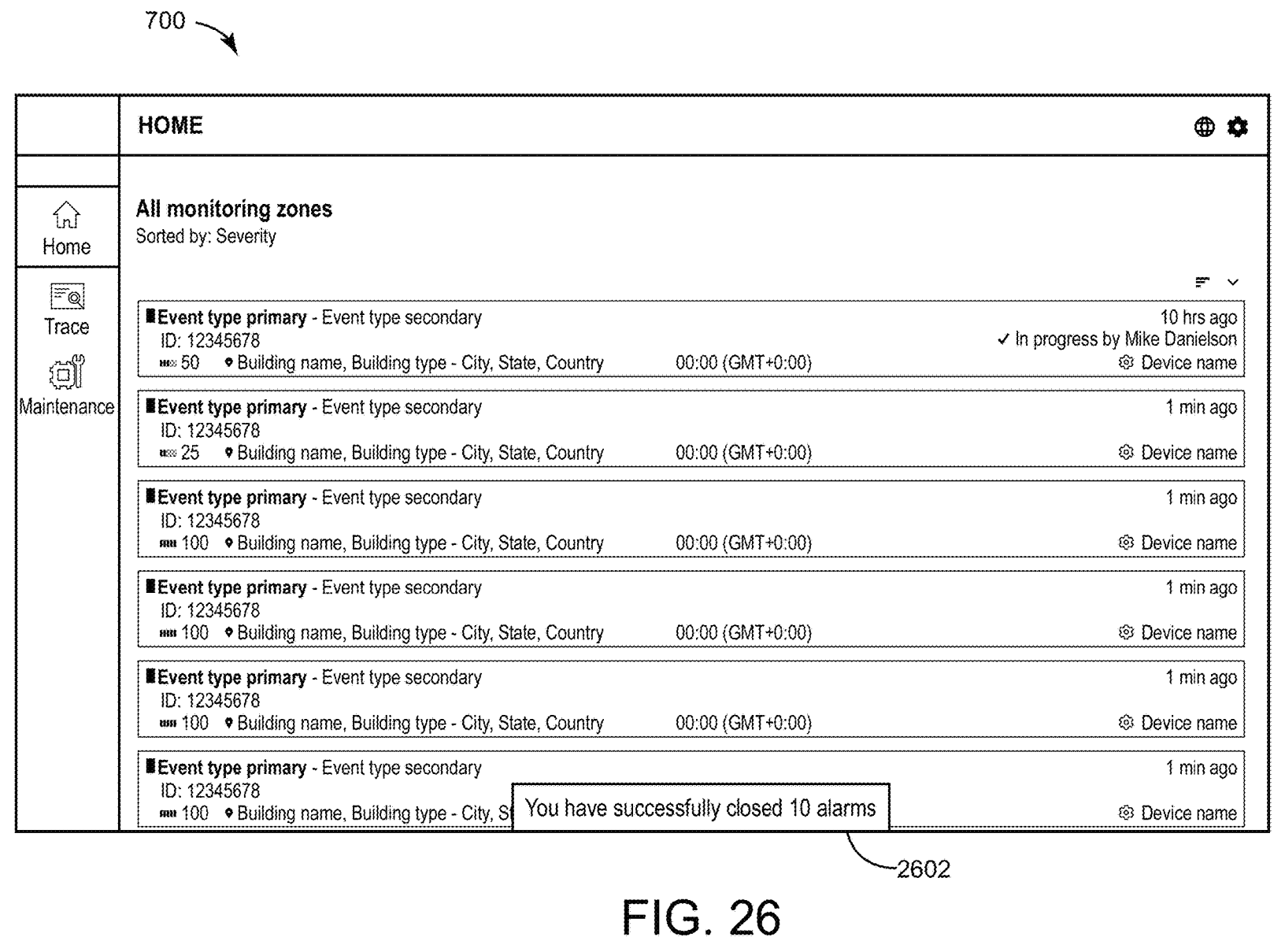
Figure 27:
FIG. 27 is the interface illustrated in FIG. 7 indicating that some of the multiple selected security events illustrated in FIGS. 24 and 25 were not successfully closed, according to an exemplary embodiment.

FIG. 26 illustrates the interface 700 when the bulk action of the user is successful. A transient, self-dismissing message 2602 can appear confirming that the user has successfully closed 10 alarms. FIG. 27 illustrates the interface 700 when the bulk action by the user is partially unsuccessful. A persistent, inset window 2702 can appear at the bottom of the page, giving dynamic feedback text to the user. In this example, the user cannot close any of the selected alarms, because three of them failed to close. The modal window states that the user cannot action on any alarm before reviewing what went wrong. The user may do this by selecting the "View" option 2704.

Figure 29:
FIG. 29 is the interface illustrated in FIG. 7 including a window with information for multiple security events that failed to close, according to an exemplary embodiment.

FIG. 28 is a detail of an alarm list item where the user ignores the modal window and hovers their cursor over the alarm list item. All actions in respect of that alarm are disabled. FIG. 29 shows the alarm list view and the inset modal window, where the user selects the "View" option 2704. The window 2900 expands to show a list of all the alarms that could not be closed in the bulk action, giving reasons regarding why each of the alarms failed to close. The top of the window 2900 displays a message 2902 that the specified alarms could not be closed. The user may dismiss the modal window by selecting the "Dismiss" action 2904 or by selecting outside the modal window 2900.

Badge Tracing Email

Referring again to FIG. 2, the badge trace email manager 214 can be configured to generate email notifications (or other types of notifications) based on badge traces implemented by the badge trace manager 212 and cause the generated emails to be sent to email addresses of users (e.g., the user of the user device 218). In some embodiments, any type of user tracing (e.g., biometric tracing, camera tracing, etc. can be used instead of, or in addition to, tracing a user with a badge. The badge trace email manager 214 is configured to generate graphical user email notification interfaces for security monitoring system users that alerts a system operator to activities relating to a badge trace or other identity-based trace, providing detailed and relevant information, together with a direct means of accessing the details of the badge trace or identity trace for insight or further action, in some embodiments. The badge tracing email can also be applied to various other type of tracing, e.g., cellphone based location tracing, face recognition based tracing, etc.

Via the badge trace manager 212, a user may setup a badge trace program to track activities of a particular badge associated with a particular user. In some cases, a security person may want to track the behavior and/or activity of a particular user, e.g., determine whether a particular user has entered a particular building, has entered a particular room or area of a particular building, etc. The badge trace manager 212 can track the activity of the particular user via badge-based data (e.g., a badge being used at an access system) from the security systems 220. In response to particular activity occurring as determined and tracked by the badge trace manager 212, the badge trace email manager 214 can generate email notifications (or other user interface-based notifications) to alert a user or group of users of the particular activity of a user.

Referring now to FIG. 30, an email interface 3000 is shown that the badge trace email manager 214 is configured to generate and send to a user, according to an exemplary embodiment. The interface 3000 informs one or more notifiable people of activities occurring within the monitored area that are associated with a badge trace or other identity trace. The interface 3000 provides the notifiable person with detailed, contextual information about the badge or identity trace, the activity detected, the threat (if any), and other relevant information. Only the most relevant information is presented to the notifiable person and any empty data fields are omitted from the interface. This simplifies the way information is presented, making it easier for users to focus on the most important information. The interface 3000 provides a means for the notifiable person to view the trace details for further insight or action.

The interface 3000 is shown to include a summary card 3002 including identification details of the person and badge being traced, the type of activity (in this example, an access granted event), the date and time of the activity, the device detecting the badge use and its location, and the case type (in this example, threat of violence). The summary card 3002 includes a "View in" option 3004, allowing the user to open a badge trace details page. Where no case type is assigned, the summary card 3002 is displayed without this information, as the view 3014 of the summary card 3002.

The interface 3000 is shown to include a details card 3006. In the details card 3006, the details of the person traced are displayed, including all badge numbers associated with that person. The details card 3006 also includes the details of the activity, such as the type of activity, local time of the activity, building and building type, address, campus, and the device detecting the badge activity 3008. The interface 3000 further includes a case management card 3010. The case management card 3010 provides more information which can be user specified for a particular badge trace.

The interface 3000 includes email footer text 3012 confirming to the recipient that they are the person to be notified in relation to a badge trace and including the expiry date of the badge trace and the identity of the person who created the trace and when the trace was created. The email footer allows the recipient to change their preferences and provides a contact email.

Badge Tracing

Referring again to FIG. 2, the badge trace manager 212 can be configured to collected security system data from the security systems 220 and track a particular user (e.g., via a badge associated with the user) at various buildings and/or through the various buildings. The badge trace manager 212 can be configured to generate graphical user interface tools for security personnel to create a badge trace or other identity-tracking workflows. The badge trace or identity-tracking workflow can be a logic set that includes an identification of a user to track (and/or associated credentials and/or badges associated with the user to track) and users to be contacted in response to detecting activity and/or certain patterns of activity performed by the user to be tracked. The badge trace manager 212 can be configured to generate user interfaces for receiving settings for site security monitoring, access control, and identity management systems.

In some cases, a user may need to be tracked and/or a notification may need to be generated based on a detection of the user. For example, if a building employee is missing, a user may generate a badge trace for the missing employee. The badge trace manager 212 can implement the badge trace for the missing employee and, in response to detecting activity by the missing employee via security system data of the security systems 220, the badge trace manager 212 causes the badge trace email manager 214 to generate a notification (e.g., an email notification) that informs a particular user or set of users that the missing employee was detected, in some embodiments.

In another example, a particular user may be wanted for questioning by authorities. In this regard, a badge trace can be generated for the user so that a notification can be sent to the authorities if the user is detected. In yet another example, a particular user may be monitored for theft. A badge trace for the user can be generated so that if the user enters a particular storage area of a building, a notification can be generated.

Figure 31:
FIG. 31 is an interface for generating a badge trace interface for setting up badge traces that can be managed by the security system illustrated in FIG. 2, according to an exemplary embodiment.

Referring now to FIGS. 31-32, an interface 3100 for generating a new badge trace is shown, according to various exemplary embodiments. The badge trace manager 212 is configured to generate and/or manage the interface 3100, in some embodiments. The interface 3100 is a badge trace home interface which displays when the user selects the "Trace" icon from the menu bar located on the left-hand side of the screen. The badge trace widget 3102 is presented in an unexpanded form and provides input fields to create a new badge trace, in some embodiments. The unexpanded badge trace widget 3102 contains input fields for a particular name, alias, or badge identifier, to locate a person to be notified. The widget 3102 can facilitate searching for the person to be notified based on the input name, input alias, input email address, and/or input badge identifier. The widget 3102 can include input fields for an expiry date for the trace. Selecting the date field launches a calendar 3104, allowing the user to select a date. If the user makes no selection, a default expiry date can be set (e.g., 30 days).

Referring now to FIG. 32, the interface 3100 displaying the badge trace home interface is shown when the user selects the "Trace" field to enter details, according to an exemplary embodiment. As the user type in the trace fields, a drop-down menu 3202 can appear listing possible matches to the typed data from an identity directory including names and badge numbers for employees of building site. The results show the name and badge number of the individuals and, where more than one badge number is assigned to an individual, all badge numbers 3204 assigned to them. Where no match is found between the information entered into the "Trace" field with the identity directory, a non-interactive cell appears indicating this and asking the user to change the badge to trace 3206.

Figure 33:
FIG. 33 is the interface illustrated in FIG. 31 including a user selection element for selecting a user to be notified for the badge trace, according to an exemplary embodiment.

FIG. 33 shows the badge trace home interface 3100 following the selection by a user of the identity to be traced. Only name 3302 of the individual can be displayed, not the alias or badge number. If the name is too long to display, the name is truncated with an ellipsis 3304. The user starts typing the name of the person to be notified from the badge trace and a drop-down list 3306 of results is displayed as the name is typed. A trace cannot be created unless the "Trace" and "Notify" fields are completed, in some embodiments. Once the details are entered, the user clicks on the "CREATE" button 3308.

Figure 34:
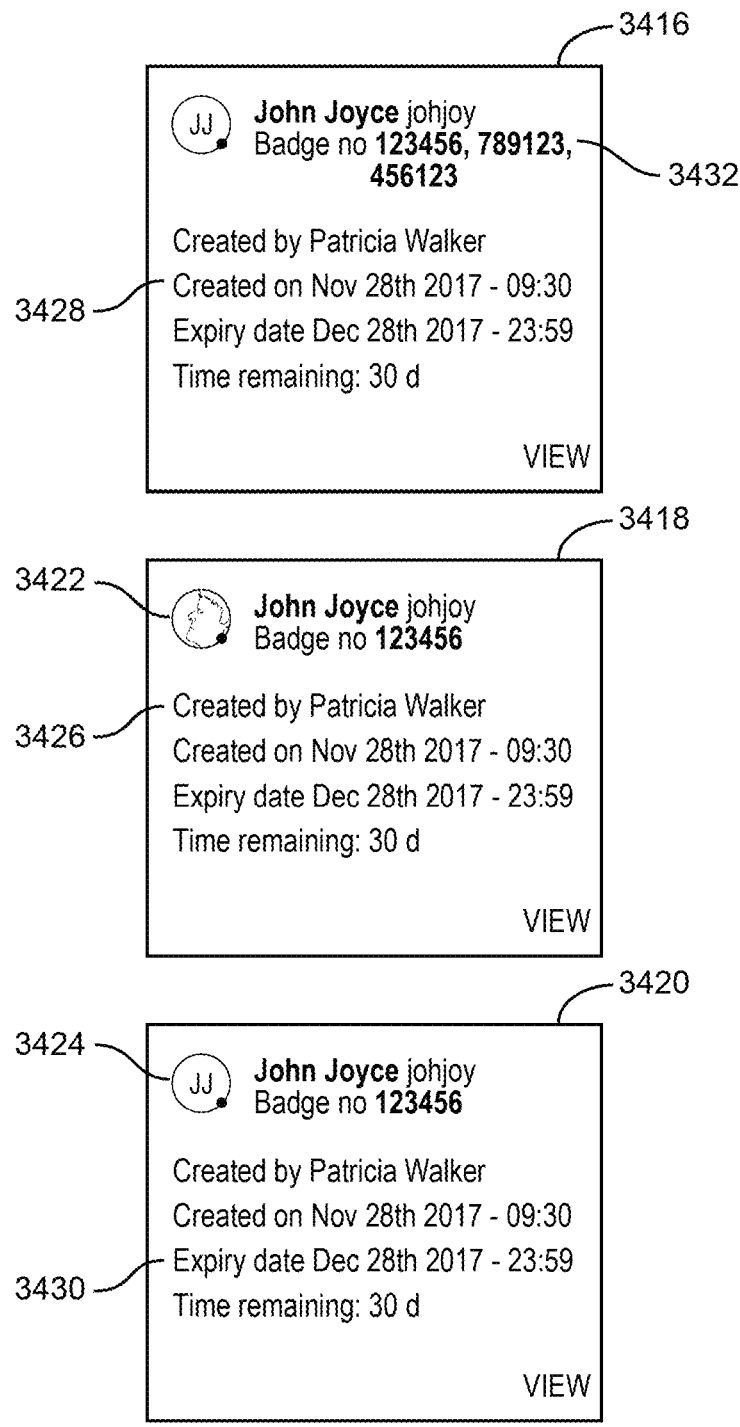
FIG. 34 is the interface illustrated in FIG. 31 including information for a generated badge trace, according to an exemplary embodiment.
Figure 35:
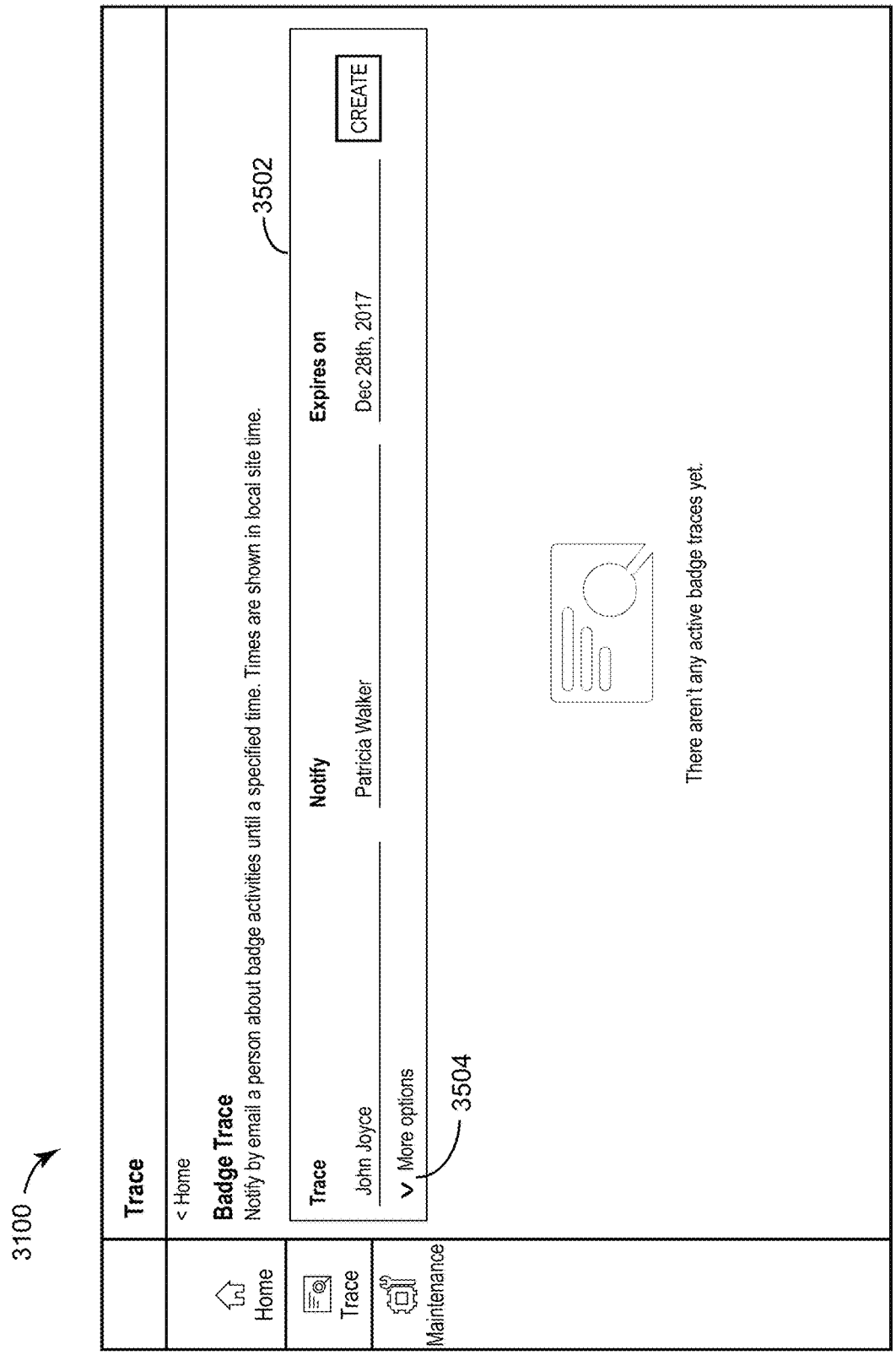

FIG. 34 shows the badge trace home interface 3100 following the creation of a new badge trace. The input fields 3402 have been reset. In the panel 3404 the newly created badge trace can be displayed as a card 3406 and tabs for "Active" and "Inactive" badge traces are displayed, with active badge trace cards displayed only in the "Active" tab 3408 and inactive badge trace cards displayed only in the "Inactive" tab 3409. By default, the "Active" tab 3108 is selected and the active traces displayed. A transient, self-dismissing message 3410 can be displayed, confirming the new badge trace, stating the name of the badge holder, the duration of the trace, and providing a "VIEW" option 3412 to view the details of the badge trace. The badge trace card 3406 can provides a "VIEW" option 3414, allowing the user to view the details of the trace.

Cards 3416, 3418, and 3420 show different examples of the badge trace card 3406 to illustrate various options. The card shows the name and alias of the badge holder, and an icon with their profile picture 3422. Where no picture is available from the system directory, the icon is the initials of the name of the person and surname 3424. The card also displays the name 3426 of the person who created the trace, the time of creation, converted to the local time 3428 of a user interacting with the interface 3100, and the expiry date of the trace, converted to a local time 3430 of the user. Where a traced individual has been assigned multiple badges, all badges 3432 are displayed.

Figure 36:
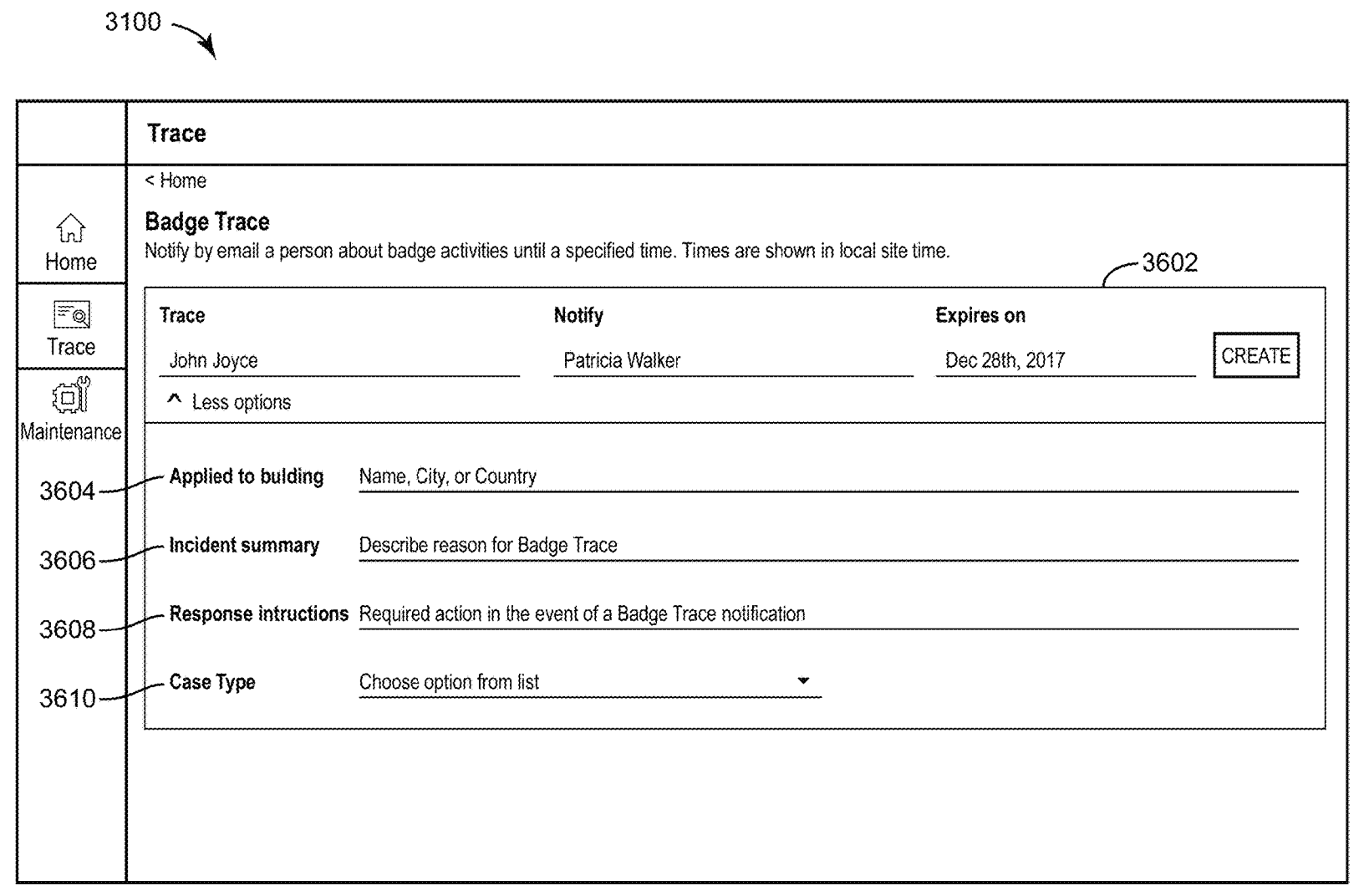

Referring now to FIGS. 35-39 the interface 3100 is shown where a user creates a new badge trace with additional options, according to various exemplary embodiments. FIG. 35 again shows the badge trace home interface 3100, where the user selects the "More options" element 3504 in the badge trace widget 3502. FIG. 36 shows the badge trace widget 3602, now expanded, and displaying various additional options. In response to an interaction with the "Applied to Building" field 3604, the badge trace manager 212 is configured to search databases of buildings to match the input string, in some embodiments. In the "Incident summary" and "Response instructions" fields 3606 and 3608, a simple text input can be required. In the "Case Type" field 3610, the user is given a drop-down list of types, for example, threat of violence, security assisted termination, harassment, theft, or missing person.

Figure 37:
Figure 38:

FIG. 37 shows the expended badge trace widget, now populated with content and a "Case Type" selection 3702 has been made. When the user selects the "Less options" element 3704, the widget returns to its unexpanded form in FIG. 38. Any additional optional information can be display in the unexpanded card.

Figure 39:
FIG. 39 is the interface illustrated in FIG. 31 including an indication that no badge traces are active, according to an exemplary embodiment.
Figure 40:
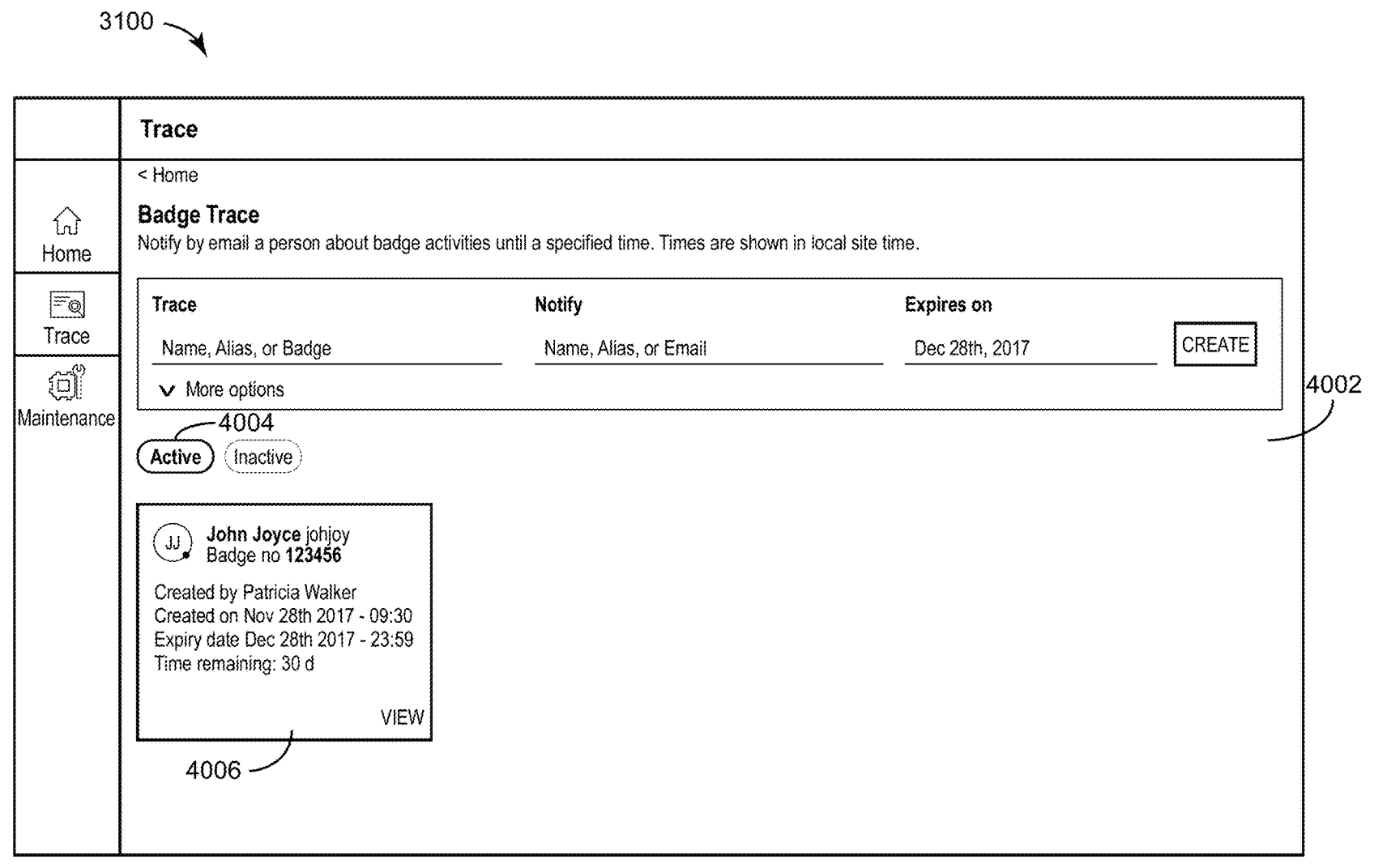

Referring now to FIGS. 39-42, active and inactive badge trace tabs of the interface 3100 are shown, according to an exemplary embodiment. FIG. 39 shows the badge trace home interface 3100 when there are no active traces in place. Inactive traces are not shown. Instead, there is a visual element 3902 indicating that there are no active badge traces. FIG. 40 shows the badge trace home interface 3100 when an active trace is in place. The panel 4002 below displays both the "Active" and "Inactive" tabs 4004, the "Active" tab is selected by default and shows a badge trace card 4006.

Figure 41:
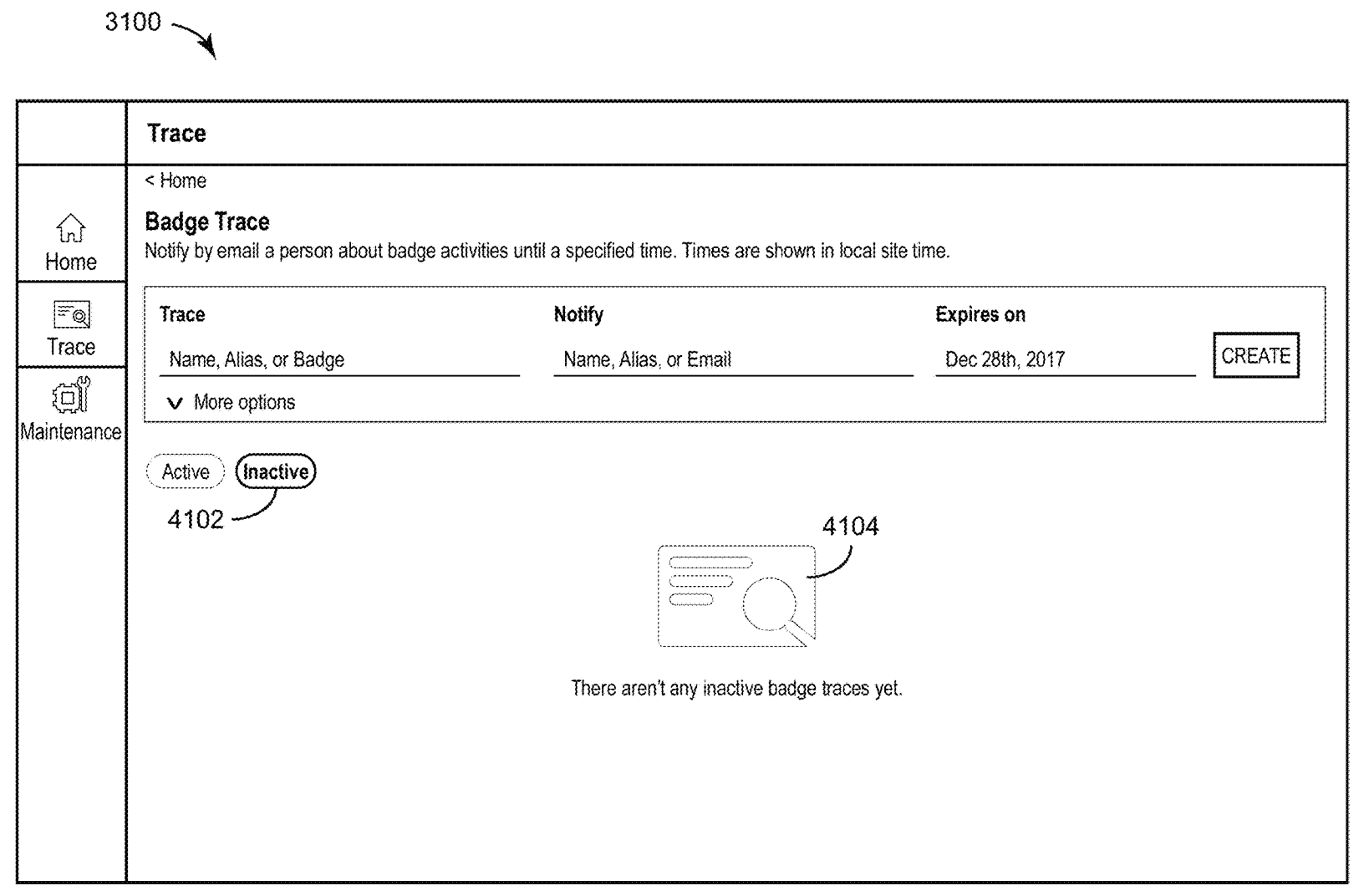

FIG. 41 shows the badge trace home interface 3100 when the user has selected the "Inactive" tab 4102. A visual element 4104 indicates that there are no inactive badge traces in place. FIG. 42 shows the badge trace home interface 3100 when the user has selected the "Inactive" tab 4202. In this example, there is an inactive badge trace in place. This is displayed as a badge trace card 4204 that has expired. The expired badge trace card 4202 includes an "Expired" indicator 4200.

Figure 43:
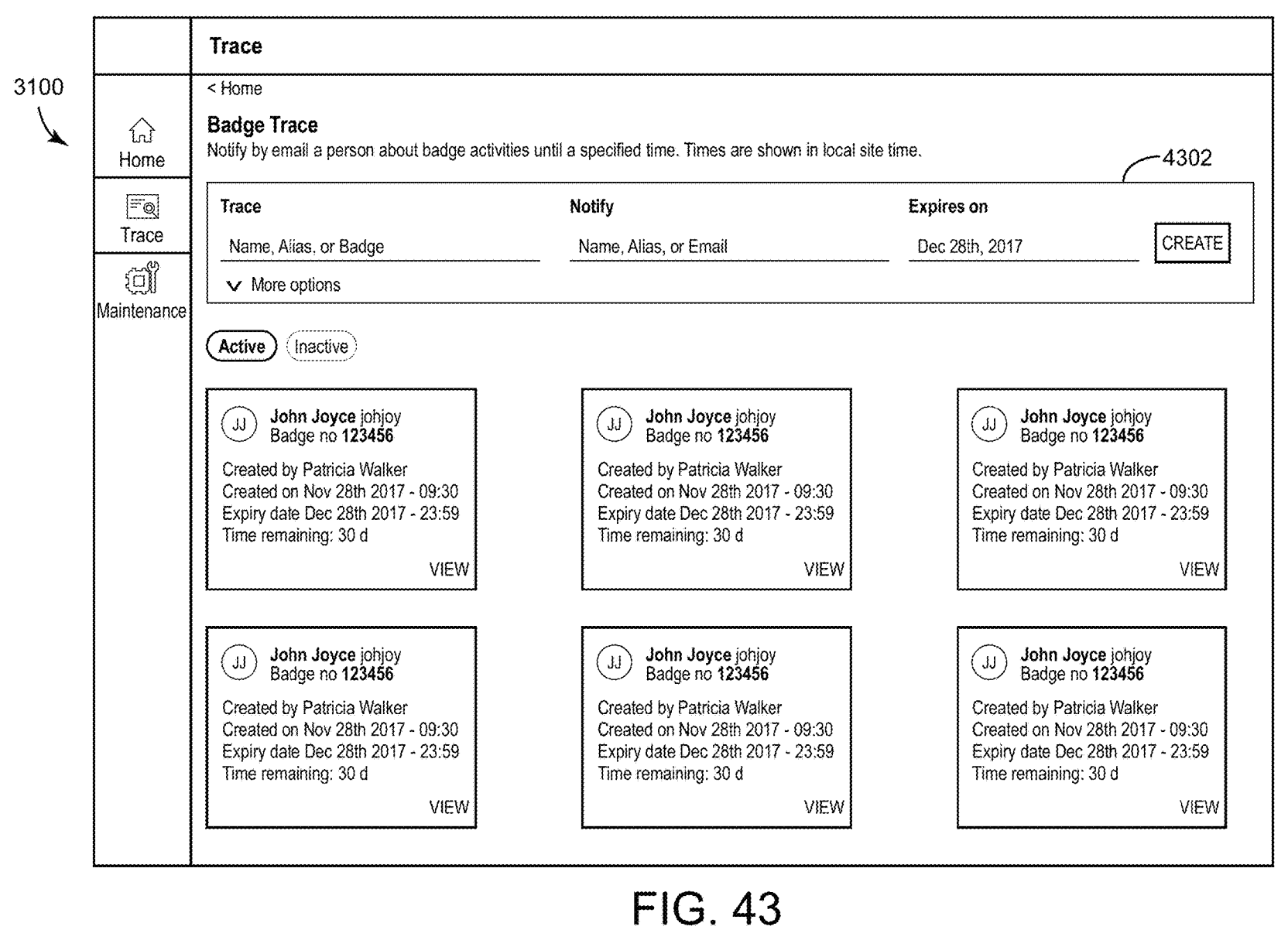
Figure 44:
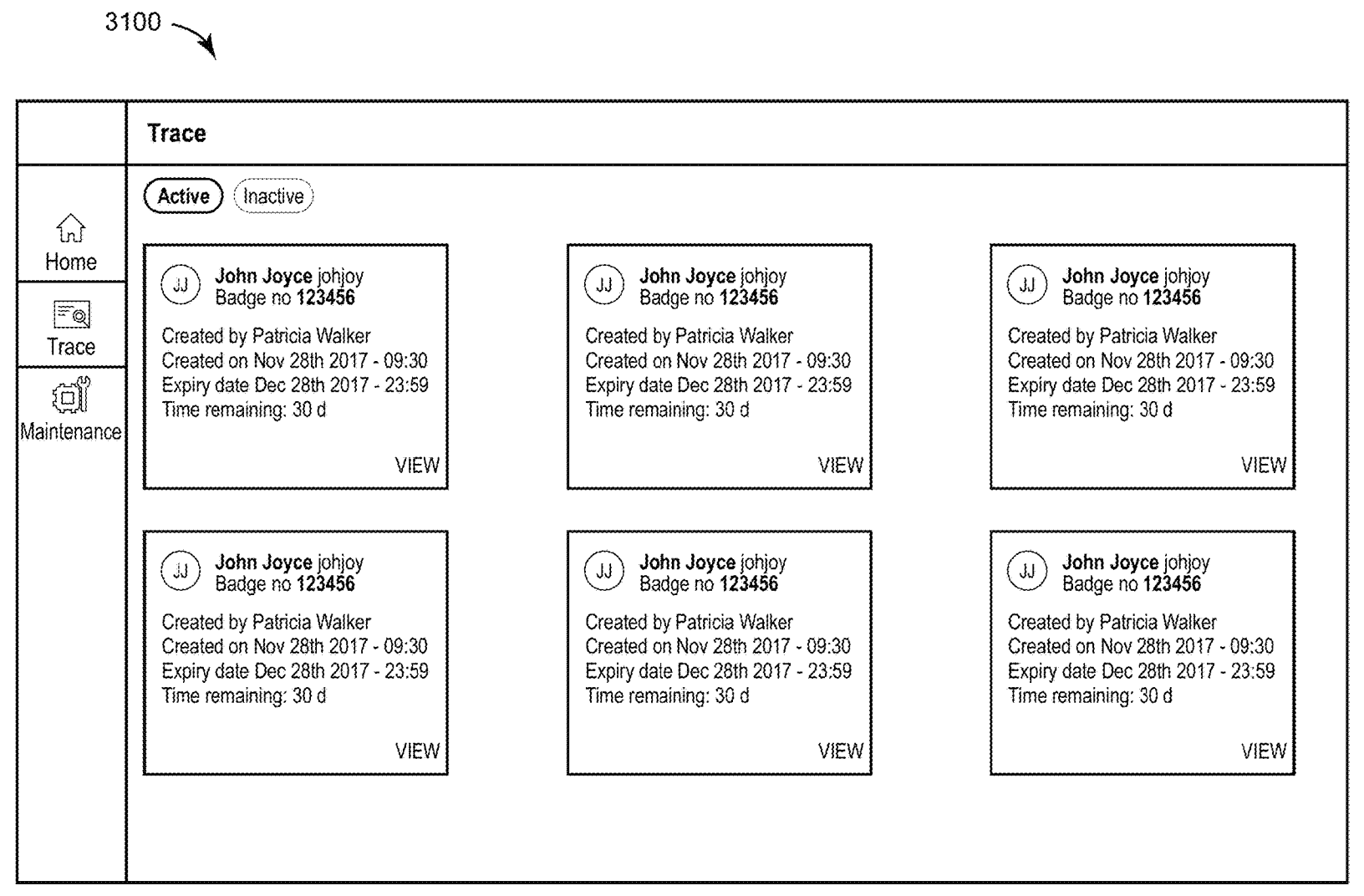
Figure 45:

Referring now to FIGS. 43-47, user interaction with badge trace home interface 3100 is illustrated, according to various exemplary embodiments. FIG. 43 shows the badge trace home interface 3100, with the "Active" tab selected and active badge trace cards displayed. When the user scrolls down, the top bar 4302 disappears, giving more screen space to allow the user to view more badge trace cards as shown in FIG. 44. When the user scrolls up, the top bar reappears as shown in FIG. 45.

Figure 46:
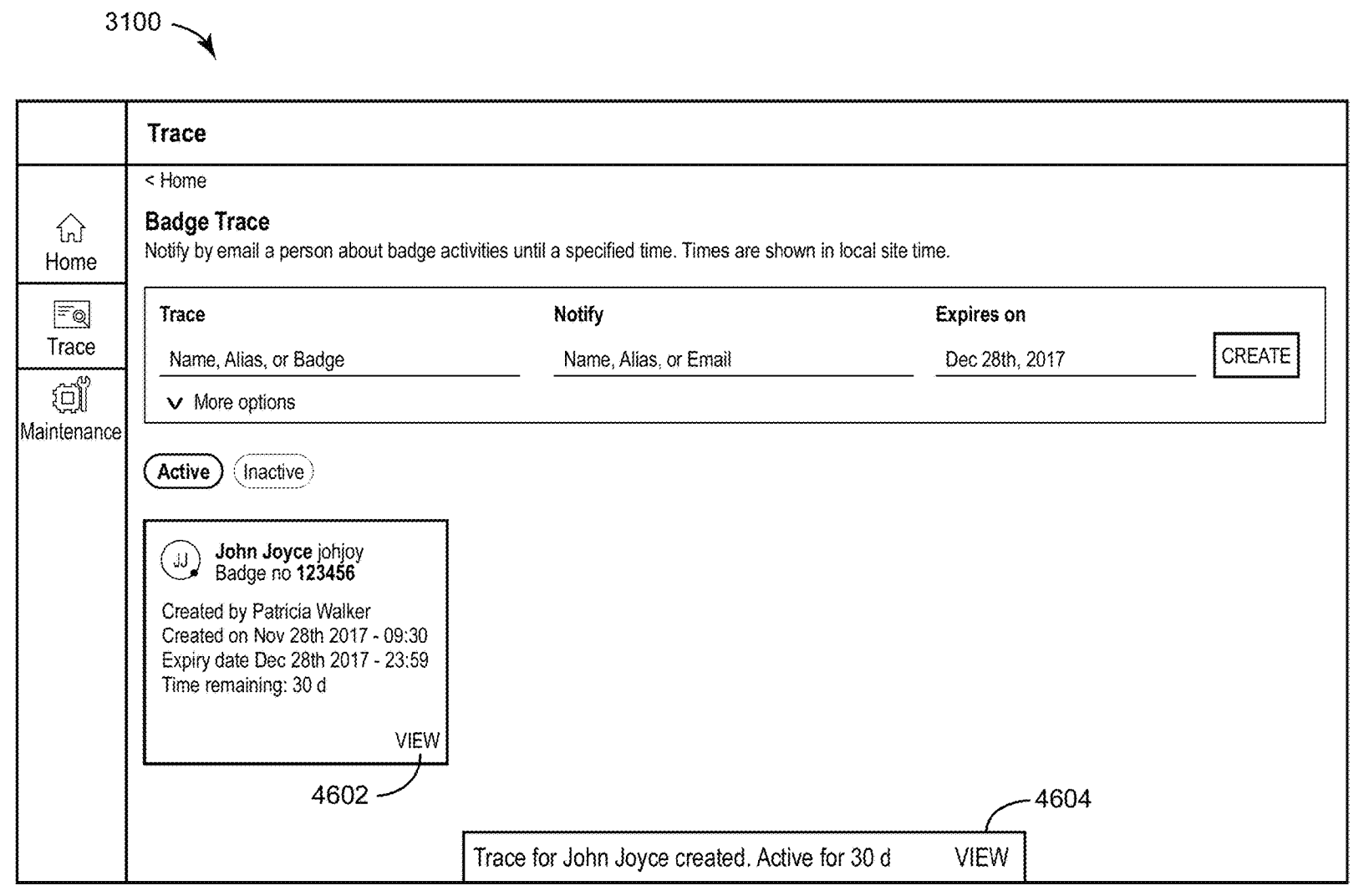

FIG. 46 shows the badge trace home interface 3100, following the creation of a new badge trace. The user can view the details of an badge trace by selecting the "VIEW" option 4602 from the badge trace card. The user may also view the same details by selecting the "VIEW" option from the transient self-dismissing notification 4604 while it is on screen. FIG. 47 shows the details of an individual badge trace. The user can select the inactive badge trace icon 4702 on the top of the screen to make the trace inactive and move it to the "Inactive" tab. If a badge trace is in the inactive tab, badge trace notifications will not be sent for the badge trace, in some embodiments. The delete icon 4704 can be disabled when the badge trace is currently active. The badge trace details page displays the time left until expiry of the trace 4706. The badge trace details page displays further information to the user, with options 4708-4716 to change or edit the information. The badge trace is separated into sections: the details of the person or badge traced 4718, the details of the person to notify 1720, the trace expiry date 4722, the details of any building, if applicable, for which notifications must be sent if the traced badge is used in that building 4724, and a section providing for additional information 4726, such as an incident summary, response instructions, case type, etc.

Figure 48:
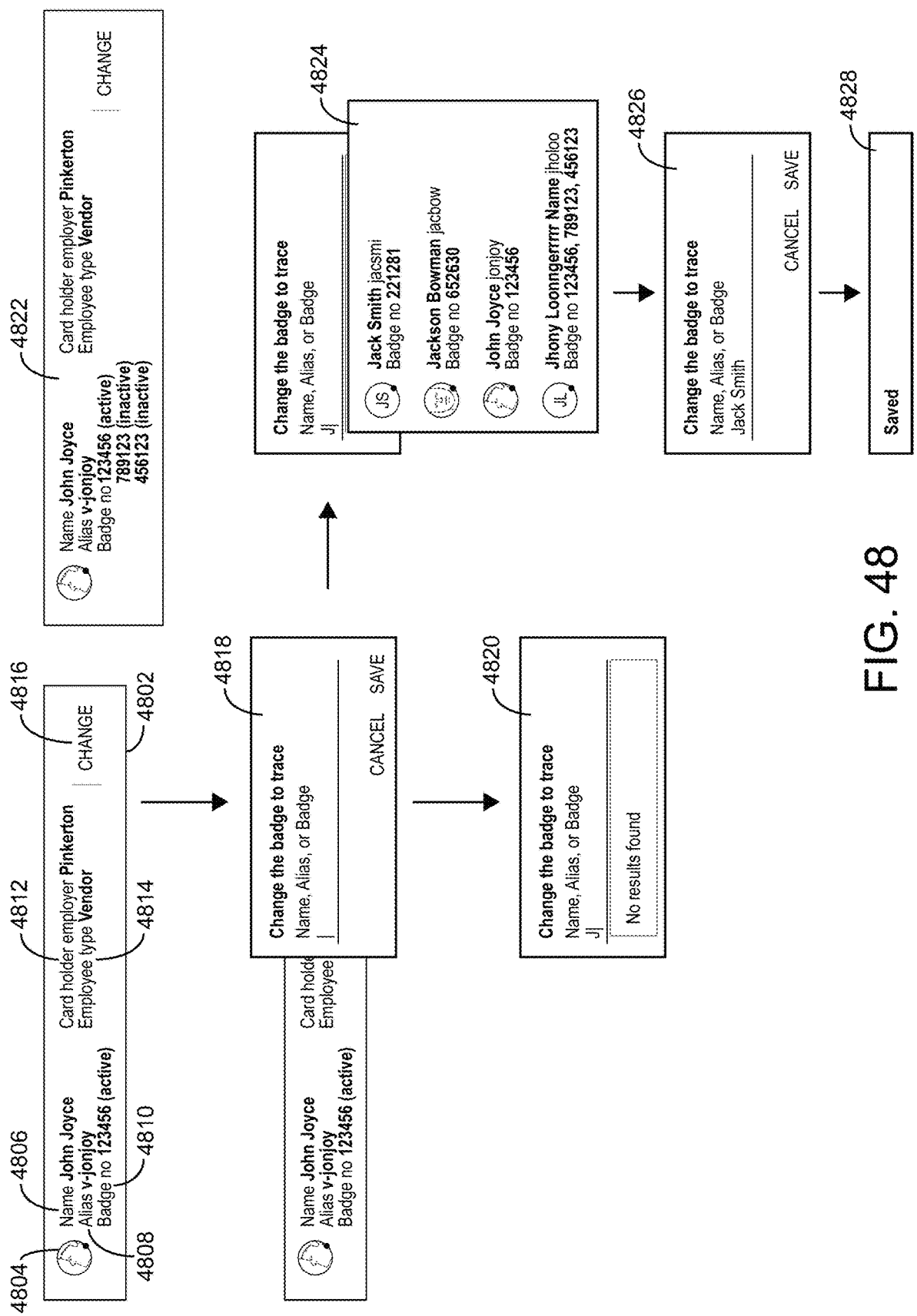
FIG. 48 are interface elements for adjusting a badge to be traced of a badge trace, according to an exemplary embodiment.
Figure 49:
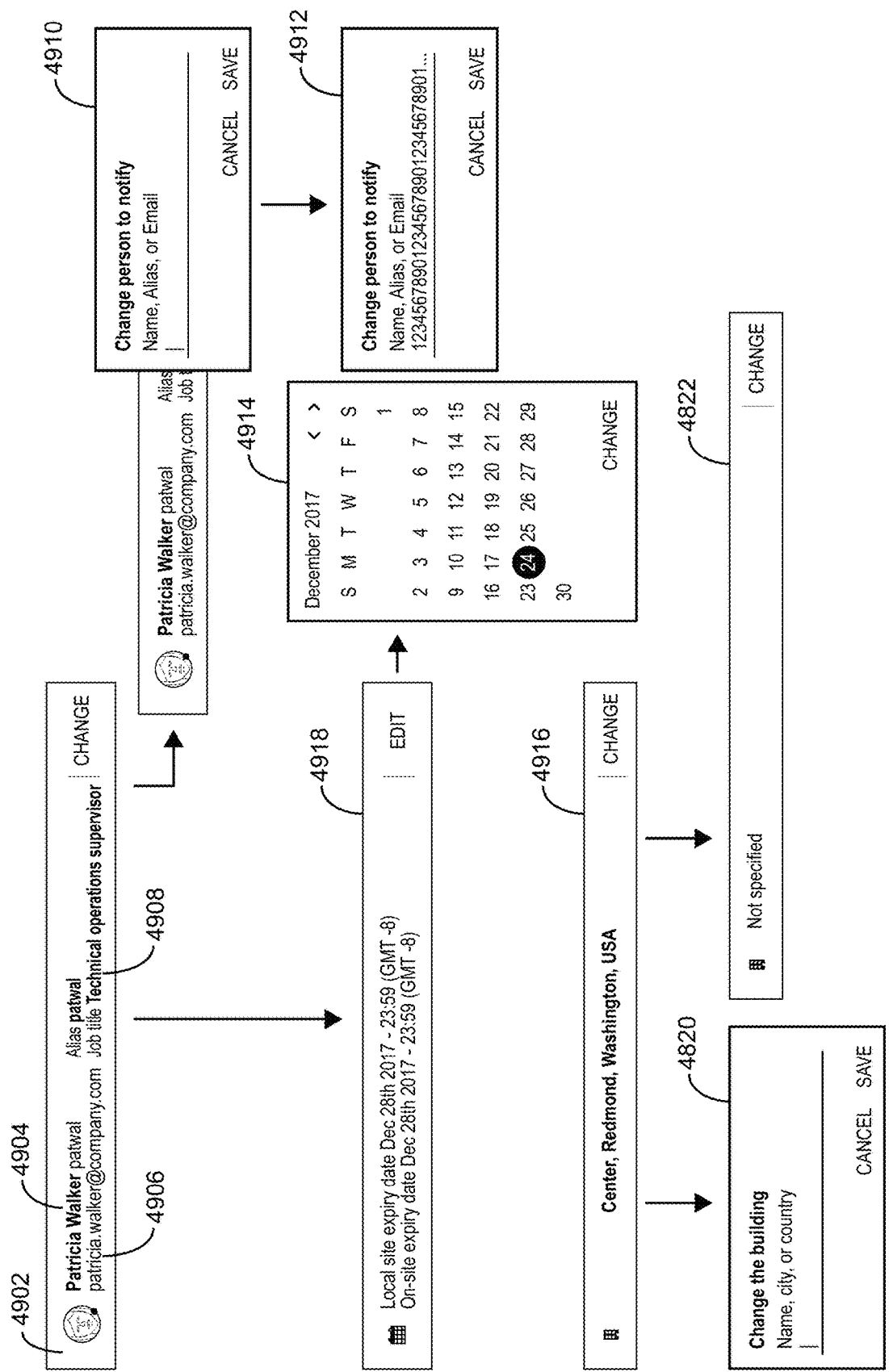
FIG. 49 are interface elements for adjusting, a user to notify for the badge trace, a date that the badge trace will expire on, and a building at which to perform the badge trace, according to an exemplary embodiment.

Referring now to FIGS. 48-52, accessing badge trace details interfaces from badge trace home interface 3100 is shown, according to various exemplary embodiments. FIG. 48 and FIG. 49 show, in more depth, some features of the sections forming part of the badge trace details page. FIG. 48 shows the "Trace" section in detail 4802. The section displays a picture 4804 of the person associated with the traced badge, if available, from the system directory, the person's name 4806, alias 4808, the badge number associated with that person 4810, the person's employer 4812, and employee type 4814. The section allows the user to change this information, using the "CHANGE" option 4816.

Where multiple badges are assigned to one person, all such badges will appear in the "Trace" section, showing their active or inactive status 4822. By selecting the "CHANGE" option, the user is presented with a window 4818, allowing them to change the name, alias, or badge number for the badge trace. Where no name, alias, or badge number is found in the system directory, a non-interactive cell displays 4820, indicating that no results were found can be displayed. As the user types in the input field, a drop-down list of possible matches is presented 4824. After the user selects a known name, alias, or email from the list 4826, the user may cancel or save the change. If saved, a transient, self-dismissing message 4828 can appear confirming that the change has been saved.

FIG. 49 shows the "Notify" section 4902 in detail. After selecting the "CHANGE" option, the user is presented with a window 4910, allowing them to change the person to notify by entering text in the field provided 4912. The procedure for making changes follows the same methodology as that for changing the identity of the badge trace (as described with reference to FIG. 48). The section displays the name of the person to be notified 4904, their work email address 4906, and their job title 4908.

The "Expiry date" section is shown in detail 4918. When the user selects the "EDIT" option, a window 4914 can appear, displaying a calendar for the user to select the expiry date of the trace, which must be a date in the future. The "Building applied" section is shown in detail in 4916. When the user selects the "CHANGE" option, a modal window 4920 appears, allowing the user to input a different building (or none). Where no building selection is made, the section displays as shown in 4922. The procedure for making changes follows the same methodology as that for changing the identity of the badge trace (as described with reference to FIG. 48).

FIG. 50 shows the "Additional information" section in detail. The user may edit this section, using the "EDIT" option 5002. Except for the connection to other data sources (in this example, called 'PPM') and "Badge Trace review date" subsections, the information in this section is taken from the "Advanced options" screen when the user creates a new badge trace. Where this information was not created, the "Additional information" section appears as 5004.

FIG. 51 shows the "Additional information" section in detail, when the user has selected the "Edit" option. Drawing 5102 shows the appearance of the section in edit mode when it contains information. The user may save or cancel any changes 5104. When the user saves the changes, the section displays the changes and a transient, self-dismissing notification appears confirming that the changes have been saved 5108. Where there was no content in the section, the appearance in edit mode looks like 5106. FIG. 52 shows the badge trace details page when a badge trace has expired. An indication is shown that it has expired 5202, the inactive option is disabled 5404, and the delete option is enabled 5106, which will allow the user to delete the badge trace from the system.

Alarm Rule Editing

Referring again to FIG. 2, the rule configuration manager 216 is configured to customize rules for generating alarms based on security data received from the security systems 220, in some embodiments. The rule configuration manager 216 is configured to generate user interfaces for configuring the alarm rules allowing a user, via the user device 218, to input configuration details for the alarm rules, in some embodiments. Based on the configuration details, the rule configuration manager 216 is configured to generate alarms based on security data received from the security systems 220, e.g., the alarms shown in the alarm lists generated and managed by the alarm list manager 208, in some embodiments. In some embodiments, the rule configuration manager 216 allows a user to adjust parameters of an existing rule. In some embodiments, the rule configuration manager 216 allows a user to create new rules with unique parameters.

The interface that the rule configuration manager 216 generates can be a graphical user interface (GUI) that provides one or multiple security advisors with a user-friendly set of tools to display, control, and configure complex event processing rules that use relationships and patterns in system data to synthesize new alarms (based on access control and/or security system data). The rule configuration manager 216 can provide users more context and insight into the actual significance of certain access control system (ACS) data via user interfaces. The complex event processing rules can be used by the rule configuration manager 216 to identify patterns of events that meet specific user defined contextual criteria. Furthermore, based on the rules the rule configuration manager 216 can be configured to generate synthetic new alarm events signifying specific security issues as a result of identified patterns alarm events. The user-friendly GUI interfaces managed by the rule configuration manager 216 help security advisors successfully and efficiently manage complex event processing rules.

Referring now to FIG. 53, an interface 5300 is shown for a rule management dashboard, according to an exemplary embodiment. The rule configuration manager 216 can be configured to generate and/or manage the interface 5300. The interface 5300 presents all rules and details, clearly and concisely to an end user via a user device, e.g., the user device 218. Rules of the rule configuration manager 216 can be displayed as cards 5302-5310 that include, in each case, a title and a rule summary. Included in this dashboard is a filter option 5312 that allows the user to hide "Enabled" or "Disabled" rules to display only one category. A switch element 5314 included in each of the rule cards 5302-5310 enables or disables individual rules. The user can "Enable all" or "Disable all" rules using the chevron-down control 5316. To edit a rule, the user clicks on the body an individual rule card.

Referring now to FIG. 54, pre-configured rule cards 5402-5410 in edit mode are shown for each of the cards 5302-5310. Elements include a descriptive title 5412, an enable/disable switch 5416, and "OK"/"CANCEL" options 5418 to save/dismiss the edit mode. To aid in security advisors' understanding, rules are presented in a sentence format showing editable variables 5414. The security advisor can edit the values 5422 and measurement units 5420 within the sentence to configure the rule. Other rules are configured using radio buttons 5424. The examples in FIG. 54 define rules for the following unauthorized use of an inactive badge 5402, unauthorized use of a temporary badge 5404, access denied limit exceeded 5406, door requires service 5408, and person of interest detection 5410.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A building system comprising one or more memory devices storing instructions thereon that, when executed by one or more processors, cause the one or more processors to:
receive site data for a plurality of sites, the site data indicating geographic locations of the plurality of sites and equipment data of systems of the plurality of sites;
perform a clustering technique with the plurality of sites by:
generating a plurality of clusters based on the geographic locations of the plurality of sites; and
classifying the plurality of sites into the plurality of clusters based on the geographic locations of the plurality of sites;
generate, based on the equipment data of the systems of the plurality of sites and a classification of the plurality of sites into the plurality of clusters, a first metric of a first group of sites of the plurality of sites assigned to a first cluster of the plurality of clusters and a second metric of a second group of sites of the plurality of sites assigned to a second cluster of the plurality of clusters, wherein the first metric indicates whether a first performance of the first group of sites meets a criterion, and the second metric indicates whether a second performance of the second group of sites meets the criterion; and
cause a user device to display a user interface providing the classification of the plurality of sites into the plurality of clusters and the first metric of the first cluster and the second metric of the second cluster.

2. The building system of claim 1, wherein the instructions cause the user device to display:
a geographic map including an overlay of:
the geographic locations of the plurality of sites; and
labels identifying the plurality of clusters that the plurality of sites are classified into.

3. The building system of claim 1, wherein the instructions cause the one or more processors to:
performing the clustering technique based on a minimum points parameter and a maximum distance parameter, wherein the minimum points parameter defines a minimum number of sites required for a cluster and the maximum distance parameter indicates a maximum distance allowed between sites of a particular cluster.

4. The building system of claim 1, wherein performing the clustering technique includes:
identifying a number of the plurality of clusters;
generating the plurality of clusters based on the number of the plurality of clusters identified.

5. The building system of claim 1, wherein the instructions cause the one or more processors to:
receive security data from the plurality of sites, the security data indicating a plurality of alarms;
generate, based on the security data, a list of the plurality of alarms for each of the plurality of clusters by sorting the plurality of alarms based on a user selected sorting parameter; and
cause the user interface to include the list of the plurality of alarms for each of the plurality of clusters.

6. The building system of claim 1, wherein the instructions cause the one or more processors to perform the clustering technique by:
identifying one or more sites that are outside the plurality of clusters; and
classifying the one or more sites as noise.

7. The building system of claim 6, wherein the instructions cause the one or more processors to identify the one or more sites that are outside the plurality of clusters by identifying that a number of other sites within a maximum distance from the one or more sites is less than a minimum number of sites for a cluster.

8. The building system of claim 1, wherein the instructions cause the one or more processors to:
cause the user interface to include a table including a first column of cluster names of the plurality of clusters and a second column including of a number of systems of the plurality of sites classified in each of the plurality of clusters.

9. The building system of claim 8, wherein the table includes:
a third column indicating a first number of systems of the plurality of sites classified in each of the plurality of clusters that are performing system tests at a first frequency greater than a particular level; and
a fourth column indicating a second number of systems of the plurality of sites classified in each of the plurality of clusters that are performing system tests at a second frequency less than the particular level.

10. A building system comprising one or more memory devices storing instructions thereon that, when executed by one or more processors, cause the one or more processors to:
receive site data for a plurality of sites, the site data indicating geographic locations of the plurality of sites and equipment data of systems of the plurality of sites;
perform a clustering technique with the plurality of sites by:
generating a plurality of clusters based on the geographic locations of the plurality of sites; and
classifying the plurality of sites into the plurality of clusters based on the geographic locations of the plurality of sites;
generate, based on the equipment data of the systems of the plurality of sites and a classification of the plurality of sites into the plurality of clusters, a first metric of a first group of sites of the plurality of sites assigned to a first cluster of the plurality of clusters and a second metric of a second group of sites of the plurality of sites assigned to a second cluster of the plurality of clusters, wherein the first metric indicates whether a first performance of the first group of sites meets a criterion, and the second metric indicates whether a second performance of the second group of sites meets the criterion; and cause a user device to display a user interface providing the classification of the plurality of sites into the plurality of clusters and the first metric of the first cluster and the second metric of the second cluster.

11. The building system of claim 10, wherein the instructions cause the user device to display:
a geographic map including an overlay of:
the geographic locations of the plurality of sites; and
labels identifying the plurality of clusters that the plurality of sites are classified into.

12. The building system of claim 10, wherein the instructions cause the one or more processors to:
performing the clustering technique based on a minimum points parameter and a maximum distance parameter, wherein the minimum points parameter defines a minimum number of sites required for a cluster and the maximum distance parameter indicates a maximum distance allowed between sites of a particular cluster.

13. The building system of claim 10, wherein performing the clustering technique includes:
identifying a number of the plurality of clusters;
generating the plurality of clusters based on the number of the plurality of clusters identified.

14. The building system of claim 10, wherein the instructions cause the one or more processors to:
receive security data from the plurality of sites, the security data indicating a plurality of alarms;
generate, based on the security data, a list of the plurality of alarms for each of the plurality of clusters by sorting the plurality of alarms based on a user selected sorting parameter; and
cause the user interface to include the list of the plurality of alarms for each of the plurality of clusters.

15. The building system of claim 10, wherein the instructions cause the one or more processors to perform the clustering technique by:
identifying one or more sites that are outside the plurality of clusters; and
classifying the one or more sites as noise.

16. The building system of claim 15, wherein the instructions cause the one or more processors to identify the one or more sites that are outside the plurality of clusters by identifying that a number of other sites within a maximum distance from the one or more sites is less than a minimum number of sites for a cluster.

17. The building system of claim 10, wherein the instructions cause the one or more processors to:
cause the user interface to include a table including a first column of cluster names of the plurality of clusters and a second column including of a number of systems of the plurality of sites classified in each of the plurality of clusters.

18. The building system of claim 17, wherein the table includes:
a third column indicating a first number of systems of the plurality of sites classified in each of the plurality of clusters that are performing system tests at a first frequency greater than a particular level; and
a fourth column indicating a second number of systems of the plurality of sites classified in each of the plurality of clusters that are performing system tests at a second frequency less than the particular level.

19. One or more memory devices storing instructions thereon that, when executed by one or more processors, cause the one or more processors to:
receive site data for a plurality of sites, the site data indicating geographic locations of the plurality of sites and equipment data of systems of the plurality of sites;
perform a clustering technique with the plurality of sites by:
generating a plurality of clusters based on the geographic locations of the plurality of sites; and
classifying the plurality of sites into the plurality of clusters based on the geographic locations of the plurality of sites;
generate, based on the equipment data of the systems of the plurality of sites and a classification of the plurality of sites into the plurality of clusters, a first metric of a first group of sites of the plurality of sites assigned to a first cluster of the plurality of clusters and a second metric of a second group of sites of the plurality of sites assigned to a second cluster of the plurality of clusters, wherein the first metric indicates whether a first performance of the first group of sites meets a criterion, and the second metric indicates whether a second performance of the second group of sites meets the criterion; and
cause a user device to display a user interface providing the classification of the plurality of sites into the plurality of clusters and the first metric of the first cluster and the second metric of the second cluster.

20. The one or more memory devices of claim 19, wherein the instructions cause the user device to display:
a geographic map including an overlay of:
the geographic locations of the plurality of sites; and
labels identifying the plurality of clusters that the plurality of sites are classified into.

* * * * *